US012587612B2

(12) United States Patent
Peck et al.

(10) Patent No.: US 12,587,612 B2
(45) Date of Patent: Mar. 24, 2026

(54) METHOD AND DEVICE FOR INVOKING PUBLIC OR PRIVATE INTERACTIONS DURING A MULTIUSER COMMUNICATION SESSION

(71) Applicant: Apple Inc., Cupertino, CA (US)

(72) Inventors: Jessica J. Peck, San Jose, CA (US); Niranjan Manjunath, San Jose, CA (US); Willem Mattelaer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 17/989,972

(22) Filed: Nov. 18, 2022

(65) Prior Publication Data

US 2023/0336689 A1      Oct. 19, 2023

Related U.S. Application Data

(63) Continuation of application No. 17/908,061, filed as application No. PCT/US2021/020657 on Mar. 3, 2021, now abandoned.

(Continued)

(51) Int. Cl.
*H04N 7/15*          (2006.01)
*G06F 3/01*          (2006.01)
(Continued)

(52) U.S. Cl.
CPC ............. *H04N 7/152* (2013.01); *G06F 3/013* (2013.01); *G06F 3/017* (2013.01); *G06F 3/14* (2013.01);
(Continued)

(58) Field of Classification Search
CPC ........ H04N 7/152; H04N 7/147; H04N 7/157; G06F 3/013; G06F 3/017; G06F 3/14;
(Continued)

(56) References Cited

U.S. PATENT DOCUMENTS 3,667,138 A * 6/1972 Cohen ..................... G09B 5/04
                                                        434/185
10,810,415 B1 * 10/2020 Richter ................. G06V 10/40
                         (Continued)

FOREIGN PATENT DOCUMENTS

CN          104520849 A      4/2015
CN          107003797 A      8/2017
                  (Continued)

OTHER PUBLICATIONS

PCT International Search Report and Written Opinion issued Jun. 9, 2021, PCT International Application No. PCT/US2021/020657, pp. 1-11.

(Continued)

*Primary Examiner* — Phung-Hoang J Nguyen
(74) *Attorney, Agent, or Firm* — YHE Law LLP

(57)                ABSTRACT

A method of invoking public and private interactions during a multiuser communication session includes presenting a multiuser communication session; detecting a user invocation input that corresponds to a trigger to a digital assistant; detecting a user search input that corresponds to a request for information; obtaining the information based on the request; presenting the information; in accordance with a determination that at least one of the user invocation input and the user search input satisfy first input criteria associated with a first request type: transmitting the information to other electronic devices for presentation to other users; and in accordance with a determination that at least one of the user invocation input and the user search input satisfy second input criteria associated with a second request type: forgoing transmitting the information to the other electronic devices for presentation to other users.

42 Claims, 17 Drawing Sheets

Related U.S. Application Data

(60) Provisional application No. 62/987,152, filed on Mar. 9, 2020.

(51) Int. Cl.

| | |
|---|---|
| *G06F 3/14* | (2006.01) |
| *G06F 3/16* | (2006.01) |
| *G06T 7/70* | (2017.01) |
| *G06T 19/00* | (2011.01) |
| *G06V 40/20* | (2022.01) |
| *H04L 12/18* | (2006.01) |
| *H04N 7/14* | (2006.01) |

(52) U.S. Cl.
CPC .................. *G06F 3/16* (2013.01); *G06T 7/70* (2017.01); *G06T 19/006* (2013.01); *G06V 40/20* (2022.01); *H04L 12/1822* (2013.01); *H04N 7/147* (2013.01); *H04N 7/157* (2013.01)

(58) Field of Classification Search
CPC ... G06F 3/16; G06F 3/011; G06T 7/70; G06T 19/006; G06V 40/20; H04L 12/1822; H04M 3/567
See application file for complete search history.

(56) References Cited

U.S. PATENT DOCUMENTS

| | | | | |
|---|---|---|---|---|
| 11,683,447 | B2* | 6/2023 | Lin | H04N 7/15 |
| | | | | 715/753 |
| 2012/0017149 | A1* | 1/2012 | Lai | H04L 65/403 |
| | | | | 715/758 |
| 2013/0198657 | A1* | 8/2013 | Jones | H04L 12/1827 |
| | | | | 715/753 |

| | | | | |
|---|---|---|---|---|
| 2014/0063174 | A1* | 3/2014 | Junuzovic | G06Q 10/101 |
| | | | | 348/E7.083 |
| 2015/0088514 | A1 | 3/2015 | Typrin | |
| 2017/0168692 | A1* | 6/2017 | Chandra | G06F 3/017 |
| 2019/0391726 | A1 | 12/2019 | Iskandar et al. | |
| 2020/0065571 | A1 | 2/2020 | Desai et al. | |
| 2020/0154187 | A1* | 5/2020 | Fukumoto | G10L 25/78 |
| 2021/0142552 | A1* | 5/2021 | Kimura | G06T 17/20 |

FOREIGN PATENT DOCUMENTS

| | | |
|---|---|---|
| CN | 108701013 A | 10/2018 |
| CN | 110462659 A | 11/2019 |
| WO | 2014/025711 A1 | 2/2014 |
| WO | 2017/044257 A1 | 3/2017 |
| WO | 2017/213684 A1 | 12/2017 |
| WO | 2018/164781 A1 | 9/2018 |

OTHER PUBLICATIONS

Office Action received for Indian Patent Application No. 202217051442, mailed on Feb. 14, 2025, 1 page.

Office Action received for European Patent Application No. 21713864.3, mailed on Nov. 20, 2024, 5 pages.

Intention to Grant received for European Patent Application No. 21713864.3, mailed on Nov. 17, 2025, 10 pages.

Office Action received for Chinese Patent Application No. 202180019602.X, mailed on Dec. 10, 2025, 19 pages (9 pages of English Translation and 10 pages of Official Copy).

Xingxing et al., "Research and Implementation of Semantic Recognition and Search Method Based on Metadata", Science of Surveying and Mapping, vol. 33, Issue 5 DOI: 10.3771/j.issn.1009-2307.2008.05.023, Sep. 2008, pp. 67-69.

* cited by examiner

Operating System 230

Multiuser Communication Session Handler 232

CGR Experience Engine 240

Data Obtainer 242

Data Transmitter 244

CGR Content Engine 246

Public-Private Interaction Engine 250

User Invocation Handler 252

User Search Handler 254

220

110

Comm. Interface(s) 208

Programming Interface(s) 210

CPU(s) 202

I/O Devices 206

204

METHOD AND DEVICE FOR INVOKING PUBLIC OR PRIVATE INTERACTIONS DURING A MULTIUSER COMMUNICATION SESSION

CROSS-REFERENCE TO RELATED APPLICATIONS

This application is a continuation of U.S. Non-Provisional patent application Ser. No. 17/908,061, filed Aug. 30, 2022, which claims priority to International Patent App. No. PCT/US2021/020657, filed on Mar. 3, 2021, which claims priority to U.S. Provisional Patent App. No. 62/987,152, filed on Mar. 9, 2020, which are hereby incorporated by reference in their entireties.

TECHNICAL FIELD

The present disclosure generally relates to multiuser communication sessions, and in particular, to systems, methods, and devices for invoking public or private interactions during a multiuser communication session.

BACKGROUND

During a multiuser communication session (e.g., a teleconference, a videoconference, a computer-generated reality (CGR) conference, or the like), a user may request information (e.g., a voice-based digital assistant request). Current systems lack logic to determine whether the output of the request should be shared with (A) all users of the multiuser communication session (i.e., a public interaction) or (B) only the requesting user (i.e., a private interaction). Thus, according to some implementations, a multiuser communication system described herein will receive a request and, depending on state or movement of a requesting user, respond publicly to all users of the multiuser communication session or privately to a subset of the users of the multiuser communication session.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
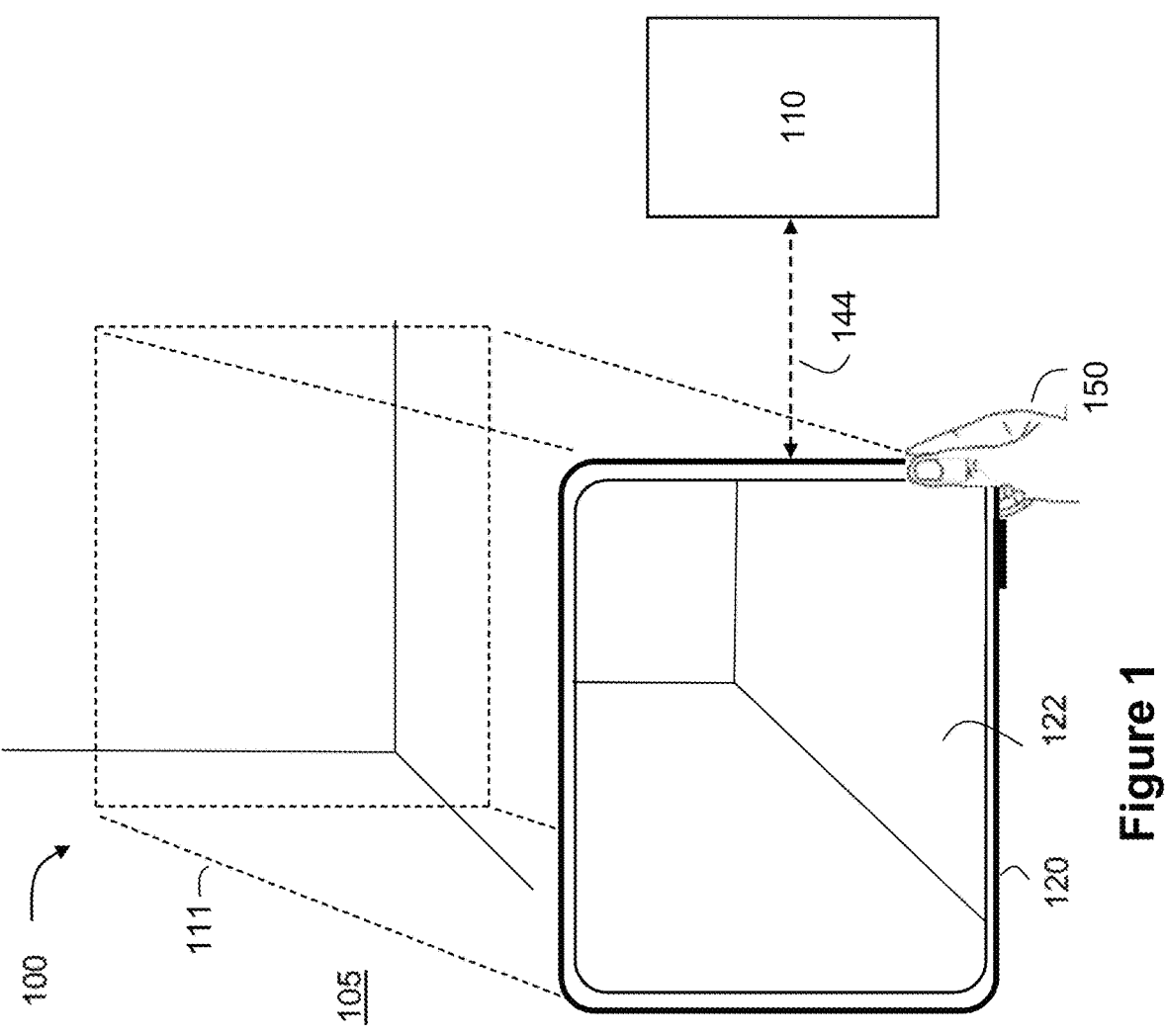
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for invoking public and private interactions during a multiuser communication session. According to some implementations, the method is performed at a computing system including non-transitory memory and one or more processors, wherein the computing system is communicatively coupled to a display device, one or more input devices, and one or more output devices. The method includes presenting a multiuser communication session that includes a first user associated with a computing system and one or more other users associated with one or more other electronic devices. While presenting the multiuser communication session, the method includes detecting a user invocation input that corresponds to a trigger to a digital assistant; detecting a user search input that corresponds to a request for information. In response to detecting the user search input, the method includes obtaining the information based on the request. The method further includes, in accordance with a determination that at least one of the user invocation input and the user search input satisfy first input criteria associated with a first request type: presenting the information; and transmitting the information to the one or more other electronic devices for presentation to the one or more other users. The method further includes, in accordance with a determination that at least one of the user invocation input and the user search input satisfy second input criteria associated with a second request type: presenting the information; and forgoing transmitting the information to the one or more other electronic devices for presentation to the one or more other users.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, a computer-generated reality (CGR) environment refers to a wholly or partially simulated environment that people sense and/or interact with via an electronic device. For example, the CGR environment may include augmented reality (AR) content, mixed reality (MR) content, virtual reality (VR) content, and/or the like. With an CGR system, a subset of a person's physical motions, or representations thereof, are tracked, and, in response, one or more characteristics of one or more virtual objects simulated in the CGR environment are adjusted in a manner that comports with at least one law of physics. As one example, the CGR system may detect head movement and, in response, adjust graphical content and an acoustic field presented to the person in a manner similar to how such views and sounds would change in a physical environment. As another example, the CGR system may detect movement of the electronic device presenting the CGR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the CGR system may adjust characteristic(s) of graphical content in the CGR environment in response to representations of physical motions (e.g., vocal commands).

There are many different types of electronic systems that enable a person to sense and/or interact with various CGR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate a CGR experience for a user 150 (sometimes also referred to herein as a "CGR environment" or a "graphical environment"). In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the CGR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents a CGR experience to the user 150 while the user 150 is physically present within a physical environment 105 within the field-of-view (FOV) 111 of the electronic device 120. As such, in some implementations, the user 150 holds the electronic device 120 in his/her hand(s). In some implementations, while presenting the CGR experience, the electronic device 120 is configured to present CGR content (sometimes also referred to herein as "graphical content" or "virtual content") and to enable video pass-through of the physical environment 105 on a display 122. In some implementations, a viewable environment 500a represents a video representation of the physical environment 105 within the FOV 111 of the electronic device 120. For example, the electronic device 120 corresponds to a near-eye system, mobile phone, tablet, laptop, wearable computing device, or the like.

In one example, the CGR content corresponds to display-locked content such that the CGR content remains displayed at the same location on the display 122 as the FOV 111 changes due to translational and/or rotational movement of the electronic device 120. As another example, the CGR content corresponds to world-locked content such that the CGR content remains displayed at its origin location as the FOV 111 changes due to translational and/or rotational movement of the electronic device 120. As such, in this example, if the FOV 111 does not include the origin location, the CGR environment will not include the CGR content.

In some implementations, the display 122 corresponds to an additive display that enables optical see-through of the physical environment 105. For example, the display 122 correspond to a transparent lens, and the electronic device 120 corresponds to a pair of glasses worn by the user 150. As such, in some implementations, the electronic device 120 presents a user interface by projecting the CGR content onto the additive display, which is, in turn, overlaid on the physical environment 105 from the perspective of the user 150. In some implementations, the electronic device 120 presents the user interface by displaying the CGR content on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the CGR content (e.g., a single display or one for each eye). For example, the electronic device 120 encloses the field-of-view of the user 150. In such implementations, the electronic device 120 presents the CGR environment by displaying data corresponding to the CGR environment on the one or more displays or by projecting data corresponding to the CGR environment onto the retinas of the user 150.

In some implementations, the electronic device 120 includes an integrated display (e.g., a built-in display) that displays the CGR environment. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the CGR environment. In some implementations, the electronic device 120 is replaced with a CGR chamber, enclosure, or room configured to present CGR content in which the user 150 does not wear the electronic device 120.

In some implementations, the controller 110 and/or the electronic device 120 cause a CGR representation of the user 150 to move within the CGR environment based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like. In some implementations, the one or more input devices track at least one of hand gestures and eye or gaze direction.

Figure 2:
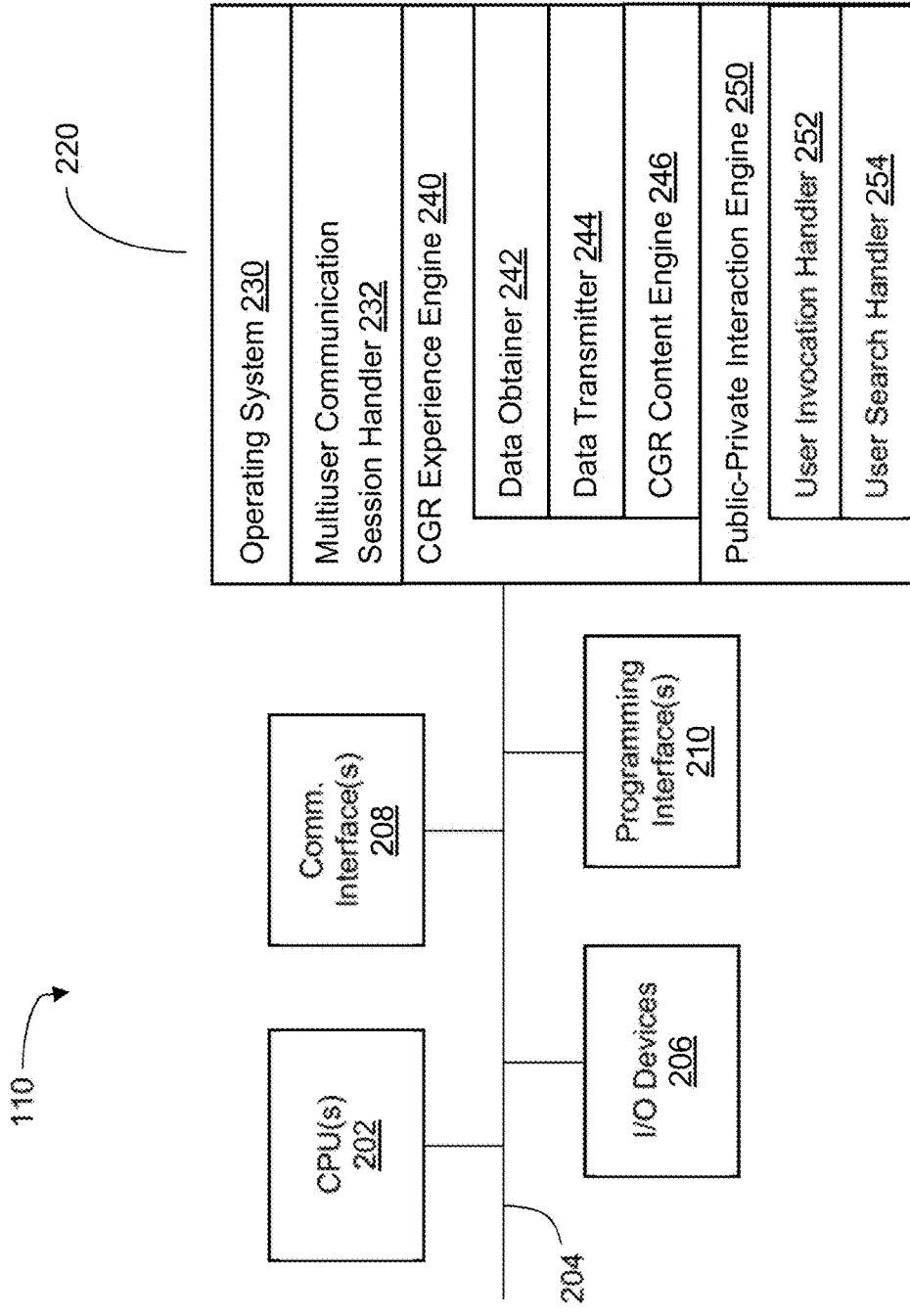
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, input devices include one or more cameras, a touchscreen, and microphone devices, among others. Camera and microphone devices may respectively capture visual or audio information within or outside ranges of human perception, and may include ultrasonic, infrared, or other frequencies of light or sound. In some implementations, output devices include speakers, display devices, and haptic feedback motors, among others. Displays may include flat-panel displays, wearable displays with transparent, translucent, or opaque displays, projectors, or other two- or three-dimensional display devices.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a multiuser communication session handler 232, a computer-generated reality (CGR) experience engine 240, and a public-private interaction engine 250.

The operating system 230 includes procedures for handling various basic system services and for performing hardware dependent tasks.

In some implementations, the multiuser communication session handler 232 is configured to handle communication between the electronic device 120 and at least one other electronic device capable of communication therewith. In some implementations, the multiuser communication session handler 232 is configured to handle at least a half-duplex or full-duplex audio communication between the electronic device 120 and at least one other electronic device capable of communication therewith. In some implementations, the multiuser communication session handler 232 is configured to handle a video communication between the electronic device 120 and at least one other electronic device capable of communication therewith. In some implementations, the multiuser communication session handler 232 is configured to handle both video and audio communication between the electronic device 120 and at least one other electronic device capable of communication therewith. To that end, in various implementations, the multiuser communication session handler 232 includes instructions and/or logic therefor, and heuristics and metadata therefor.

In some implementations, the CGR experience engine 240 is configured to manage and coordinate one or more CGR experiences (sometimes also referred to herein as "CGR environments") for one or more users (e.g., a single CGR experience for one or more users, or multiple CGR experiences for respective groups of one or more users). To that end, in various implementations, the CGR experience engine 240 includes a data obtainer 242, a data transmitter 244, and a CGR content engine 246.

In some implementations, the data obtainer 242 is configured to obtain data (e.g., presentation data, input data, user interaction data, head tracking information, camera pose tracking information, eye tracking information, hand/limb tracking information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the data transmitter 244 is configured to transmit data (e.g., presentation data such as rendered image frames associated with the CGR environment, location data, etc.) to at least the electronic device 120. To that end, in various implementations, the data transmitter 244 includes instructions and/or logic therefor, and heuristics and metadata therefor.

In some implementations, the CGR content engine 246 is configured to generate (i.e., render), manage, and modify an CGR environment presented to a user. To that end, in various implementations, the CGR content engine 246 includes instructions and/or logic therefor, and heuristics and metadata therefor.

In some implementations, the public-private interaction engine 250 is configured to identify a user invocation for a public, private, or semi-public interaction, and to execute one or more search queries in response to a public, private, or semi-public interaction. In some implementations, a public interaction includes a search request received at the electronic device 120 and returned to the electronic device 120 and all other electronic devices in communication therewith through a multiuser communication session. In some implementations, a private interaction includes a search input received at the electronic device 120 and returned only to the electronic device 120. In an exemplary private interaction, the public-private interaction engine 250 is configured to forgo transmission of a returned search input to all other electronic devices in communication with the electronic device 120 through the multiuser communication session. In some implementations, a semi-public interaction includes a search request received at the electronic device 120 and returned to the electronic device 120 and fewer than all electronic devices in communication therewith through a multiuser communication session. In an exemplary semi-public interaction, the public-private interaction engine 250 is configured to forgo transmission of a returned search request to various other electronic devices in communication with the electronic device 120 through a multiuser communication session not included in a predetermined subset of devices. In some implementations, a predetermined subset of devices may include a group of users or electronic devices defined within, by, or otherwise associated with a multiuser communication session. For example, a predetermined subset may include one or more electronic devices or users in a multiuser communication session grouped by organization, title, location, security level, adverse party designation, device hardware characteristics, network latency or topology characteristics, legal restrictions, or the like. To that end, in various implementations, the public-private interaction engine 250 includes a user invocation handler 252 and a user search handler 254.

In some implementations, the user invocation handler 252 is configured to detect user input received at the electronic device 120 through one or more I/O devices 206, communication interfaces 208, or programming interfaces 210 of the controller 110, and to identify a user invocation as a public, private, or semi-public interaction instruction. In some implementations, the user invocation handler 252 is configured to detect one or more of a hand gesture, body movement, and a body position relative to the electronic device 120, body posture, orientation of one or more fingers or digits, gaze of one or more eyes, direction of one or more eyes, dilation of one or more eyes, volume of voice input, timbre or modulation of voice input including whispering or emotion, or the like. In some implementations, the variation of one or more characteristics of a user's voice starts a first request type, a second request type, a third request type, or other request type based on the association between one or more voice characteristics and one or more request types. In some implementations, voice input at a normal speaking level will indicate a public interaction to be shared with all users, and voice input at a whisper will indicate a private or semi-public interaction to be shared, respectively, with only the requesting user or a subset of all users. In some implementations, a user may communicate exclusively with a subset of all users, e.g., a team or an organization of which the user is a member. A user may create such a "semi-public" or "sidebar" communication with a particular user invocation input, user search input, or predetermined definition. To that end, in various implementations, the user invocation handler 252 includes instructions and/or logic therefor, and heuristics and metadata therefor.

In some implementations, the user search handler 254 is configured to detect user input received at the electronic device 120 through one or more of the I/O devices 206, the communication interfaces 208, or the programming interfaces 210 of the controller 110, to identify user input defining a search query, to submit the search query to a search engine or other information source, and to receive results from the search engine or other information source. In some implementations, the user search handler 254 may include a voice-based digital assistant or the like to identify a search query received at the electronic device 120. In some implementations, the user search handler 254 may communicate with a local or remote search engine or other information source to execute the received search query and obtain one or more search results. To that end, in various implementations, the user search handler 254 includes instructions and/or logic therefor, and heuristics and metadata therefor.

Although the operating system 230, the multiuser communication session handler 232, the CGR experience engine 240, and the public-private interaction engine 250 are shown as residing on a single device (e.g., the controller 110), it should be understood that in other implementations, any combination of the operating system 230, the multiuser communication session handler 232, the CGR experience engine 240, and the public-private interaction engine 250 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
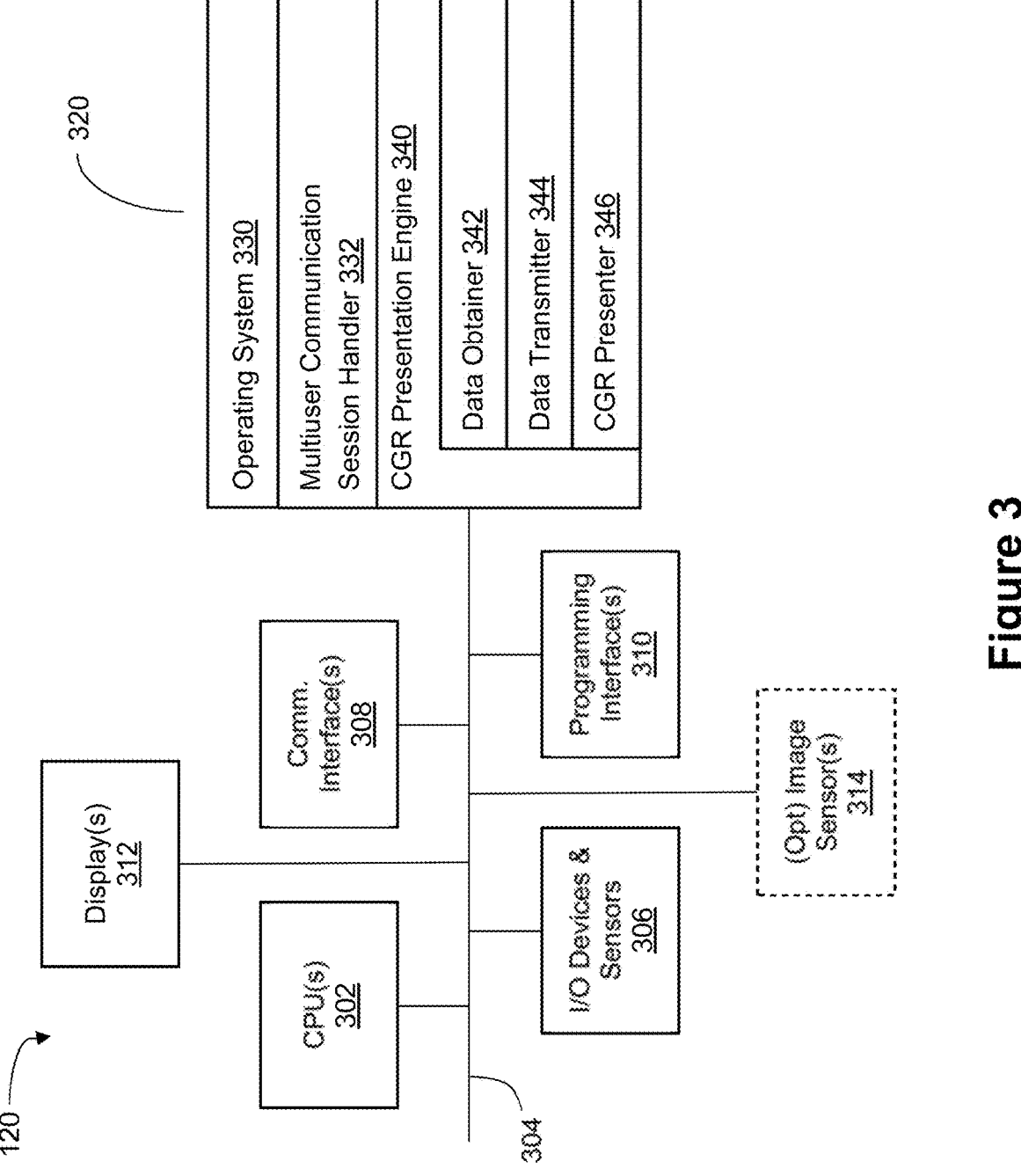
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, a head pose tracking engine, a body pose tracking engine, a camera pose tracking engine, a hand/limb tracking engine, and/or the like. In some implementations, the electronic device 120 includes a natural language processing (NLP) engine for interpreting voice commands.

In some implementations, the one or more displays 312 are configured to present the CGR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation engine 340.

The operating system 330 includes procedures for handling various basic system services and for performing hardware dependent tasks.

In some implementations, the multiuser communication session handler 332 is configured to handle communication between the electronic device 120 and at least one other electronic device capable of communication therewith. In some implementations, the multiuser communication session handler 332 is configured to handle at least a half-duplex or full-duplex audio communication between the electronic device 120 and at least one other electronic device capable of communication therewith. In some implementations, the multiuser communication session handler 332 is configured to handle a video communication between the electronic device 120 and at least one other electronic device capable of communication therewith. In some implementations, the multiuser communication session handler 332 is configured to handle both video and audio communication between the electronic device 120 and at least one other electronic device capable of communication therewith. To that end, in various implementations, the multiuser communication session handler 332 includes instructions and/or logic therefor, and heuristics and metadata therefor.

In some implementations, the CGR presentation engine 340 is configured to present and update CGR content (e.g., the rendered image frames associated with the CGR environment), including but not limited to information associated with, derived from, or otherwise in response to the one or more search results. In some implementations, the CGR presentation engine 340 may present one or more objects associated with the search results, or characteristics associated with the electronic device 120, the physical environment 105, or the user 150. In some implementations, the CGR presentation engine 340 may locate objects associated with one or more search results proximate to or overlaid upon a particular virtual or physical object within the viewable environment 100a of the electronic device 120a, including but not limited to virtual or physical people, avatars, limbs, plants, animals, furniture, natural or artificial structures, celestial objects, or the like. In some implementations, presenting may include outputting one or more of audio, video, haptic, or other user-perceptible medium. To that end, in various implementations, the CGR presentation engine 340 includes a data obtainer 342, a data transmitter 344, and a CGR presenter 346.

In some implementations, the data obtainer 342 is configured to obtain data (e.g., presentation data such as rendered image frames associated with the CGR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the data transmitter 344 is configured to transmit data (e.g., presentation data, location data, user interaction data, head tracking information, camera pose tracking information, eye tracking information, hand/limb tracking information, etc.) to at least the controller 110. To that end, in various implementations, the data transmitter 344 includes instructions and/or logic therefor, and heuristics and metadata therefor.

In some implementations, the CGR presenter 346 is configured to present and update CGR content (e.g., the rendered image frames associated with the CGR environment) via the one or more displays 312. To that end, in various implementations, the CGR presenter 346 includes instructions and/or logic therefor, and heuristics and metadata therefor.

Although the operating system 330, the multiuser communication session handler 332, and the CGR presentation engine 340 are shown as residing on a single device (e.g., the electronic device 120), it should be understood that in other implementations, any combination of the operating system 330, the multiuser communication session handler 332, and the CGR presentation engine 340 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
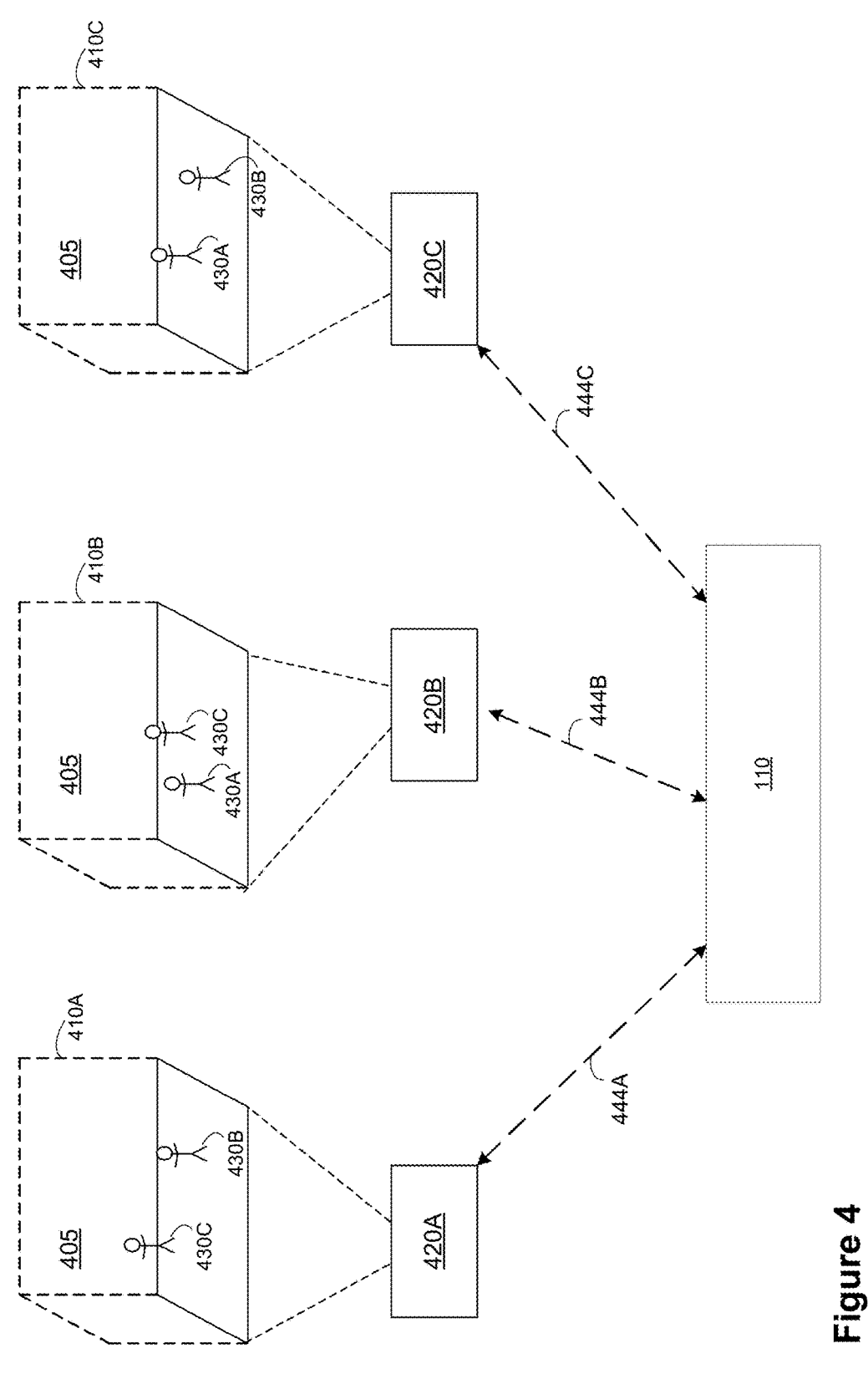
FIG. 4 is a block diagram of an example multiuser computer-generated reality (CGR) experience in accordance with some implementations.

FIG. 4 is a block diagram of an example multiuser CGR experience 400 (or similarly, a CGR experience) in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 4, a first user associated with an electronic device 420A, a second user associated with an electronic device 420B, and a third user associated with an electronic device 420C participate in the multiuser CGR experience 400. According to some implementations the electronic devices 420A, 420B, and 420C are similar to and adapted from the electronic device 120 shown in FIGS. 1 and 3.

As shown in FIG. 4, the electronic device 420A presents a first perspective 410A of the CGR environment 405 to a first user of the multiuser CGR experience 400. For example, the first perspective 410A of the CGR environment 405 includes a second avatar 430B associated with a second user and a third avatar 430C associated with a third user. As further shown in FIG. 4, the electronic device 420B presents a second perspective 410B of the CGR environment 405 to the second user of the multiuser CGR experience 400. For example, the second perspective 410B of the CGR environment 405 includes a first avatar 430A associated with the first user and the third avatar 430C associated with the third user. As further shown in FIG. 4, the electronic device 420A presents a third perspective 410C of the CGR environment 405 to the third user of the multiuser CGR experience 400. For example, the third perspective 410C of the CGR environment 405 includes a second avatar 430B associated with the second user and the first avatar 430A associated with the first user.

As shown in FIG. 4, the controller 110 coordinates the multiuser CGR experience 400 for multiple users by managing different perspectives 410A, 410B, and 410C of the CGR environment 405. To that end, the controller 110 is communicatively coupled with electronic devices 420A, 420B and 420C via wired or wireless communication channels 444A, 444B, and 444C, respectively, (e.g., BLUETOOTH, IEEE 802.11x, IEEE 802.16x, IEEE 802.3x, etc.). One of ordinary skill in the art will appreciate that the controller 110 may coordinate a shared CGR experience for any number of users. As one example, the CGR environment 405 corresponds to a telepresence conference room, a video-based group chat or call system, a virtual conference space, a multiuser CGR environment, or the like.

As one example involving the first user, according to some implementations, the controller 110 updates the first perspective 410A of the CGR environment 405 based on a change of the body pose and/or the head pose of the first user. According to some implementations, if one of the users manipulates or otherwise modifies CGR objects and/or CGR content within the CGR environment 405, the controller 110 updates the CGR environment 405 and, subsequently, the first perspective 410A, the second perspective 410B, and the perspective 410C of the multiuser CGR experience 400 accordingly.

FIGS. 5A-7D illustrate six distinct sequence of instances of a computer-generated reality (CGR) presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIGS. 5A-5D, an audio-driven CGR presentation scenario includes a first electronic device 120a associated with a first user 510 and a second electronic device associated with a second user 512. In some implementations, a portion of the physical environment 105a within the FOV 111a of the electronic device 120a appears on the display 122a as a viewable environment 500a. In some implementations, the display 122a includes one or more avatars or images of the user 512, associated with electronic device 120b, and a user 514, not associated with either electronic device 120a or 120b. In some implementations, the user 510 is associated with the electronic device 120a and is within a field-of-view (FOV) 505 of electronic device 120a. In some implementations, user 510 faces display 122a and is within FOV 505 while substantially or partially able to view the plane of display 122a. For example, the FOV 111a corresponds to a scene-facing image sensor, and the FOV 505 corresponds to a user-facing image sensor also known colloquially as a selfie-cam.

In some implementations, a portion of the physical environment 105b within the FOV 111b of the electronic device 120b appears on a display 122b as a viewable environment 500b. In some implementations, the display 122b includes one or more avatars or images of the user 510b, associated with the electronic device 120a, and the user 514, not associated with either electronic device 120a or 120b. While FIGS. 5A-5D show avatars or images of the users 510b 512 and 514, those of ordinary skill in the art will appreciate from the present disclosure that a greater or lesser number of avatars or images of users associated with any or none of the electronic devices 120a and 120b may be presented on display 122a or 122b. As one example, the users 510b, 512 and 514 are participating in a teleconference or multiuser CGR experience (sometimes referred to herein as a "multiuser communication session"). In some implementations, the viewable areas 500a and 500b correspond to separate CGR environments. In some implementations, the viewable areas 500a and 500b correspond to a shared multiuser CGR experience.

Figure 5A:
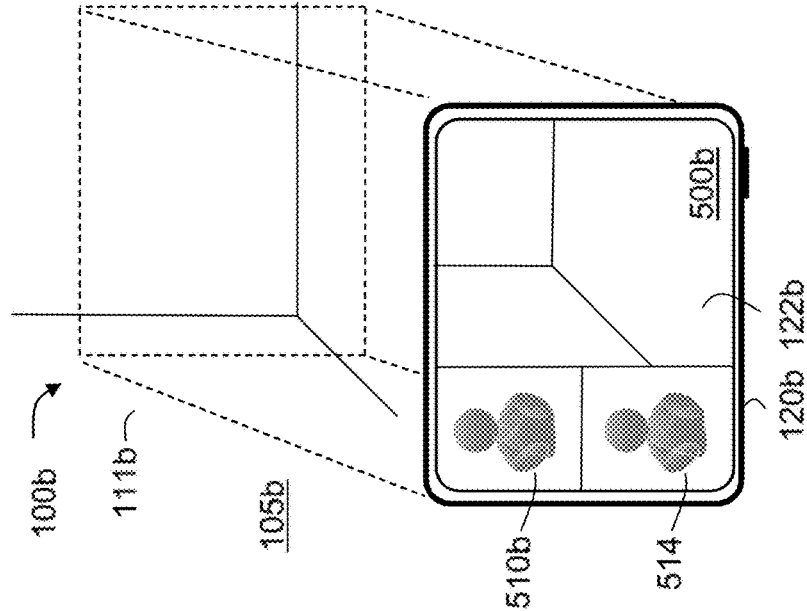
FIGS. 5A-5D illustrate a sequence of instances for invoking public and private interactions during a multiuser communication session based on the volume of a search query in accordance with some implementations.
Figure 5A:
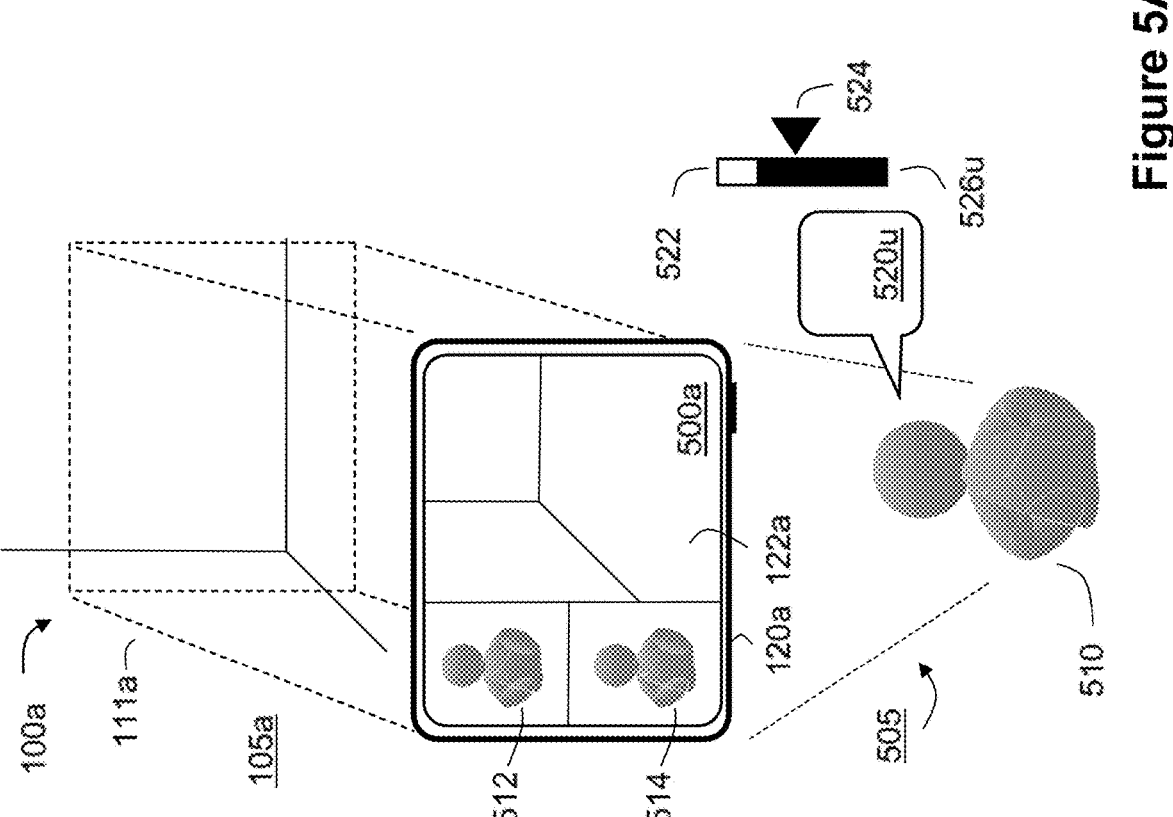

As shown in FIG. 5A, the user 510 invokes a public interaction based on a public voice command 520u within a volume range 522. In some implementations, the public voice command 520u includes a user search input to a digital assistant made at a volume level 526u above a volume threshold 524. For example, the user 510 may initiate a user search input above the volume threshold 524 with the command, "Assistant, show me the Eiffel Tower." It is to be understood that the volume threshold 524 may be static, or may change dynamically based on environmental factors, hardware factors, user factors, or the like. In some implementations, environmental factors include, but are not limited to, background noise, crosstalk, or the like. In some implementations, hardware factors include, but are not limited to, network latency, sensor sensitivity, or the like. In some implementations, user factors include, but are not limited to, hearing impairment, speech impairment, typical level or range of speaking voice, timbre or modulation of voice, or the like.

Alternatively, in some implementations, the public voice command 520u includes, but is not limited to, a user invocation input made above the volume threshold 524, at a volume level 526u. In some implementations, the volume level 526u is audio at or above a particular intensity in decibels (dB) or with particular audio characteristics associated with speech intended to be shared over a particular physical distance. In some implementations, particular audio characteristics may include timbre or intensity indicating speech above a whisper. For example, the user 510 may invoke the digital assistant with the command, "Hey, Assistant," above the volume threshold 524.

Figure 5B:
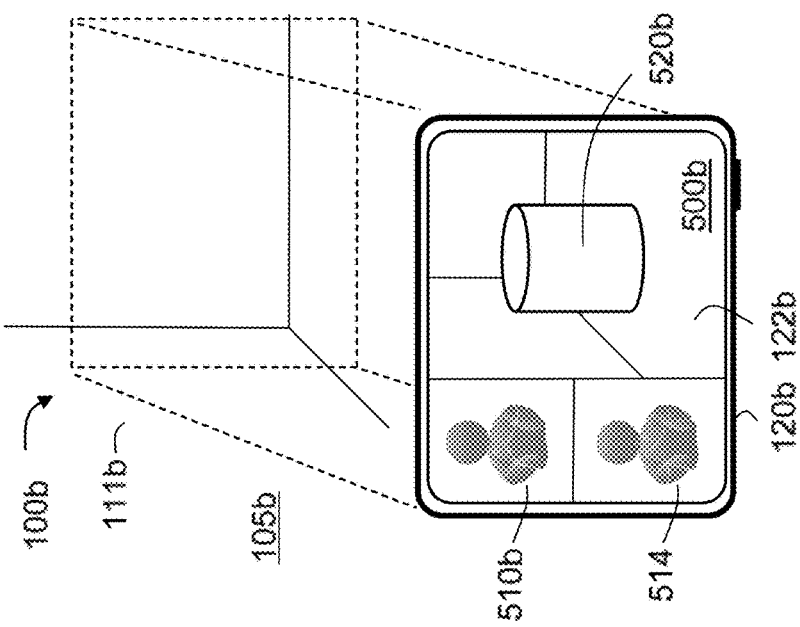
Figure 5B:
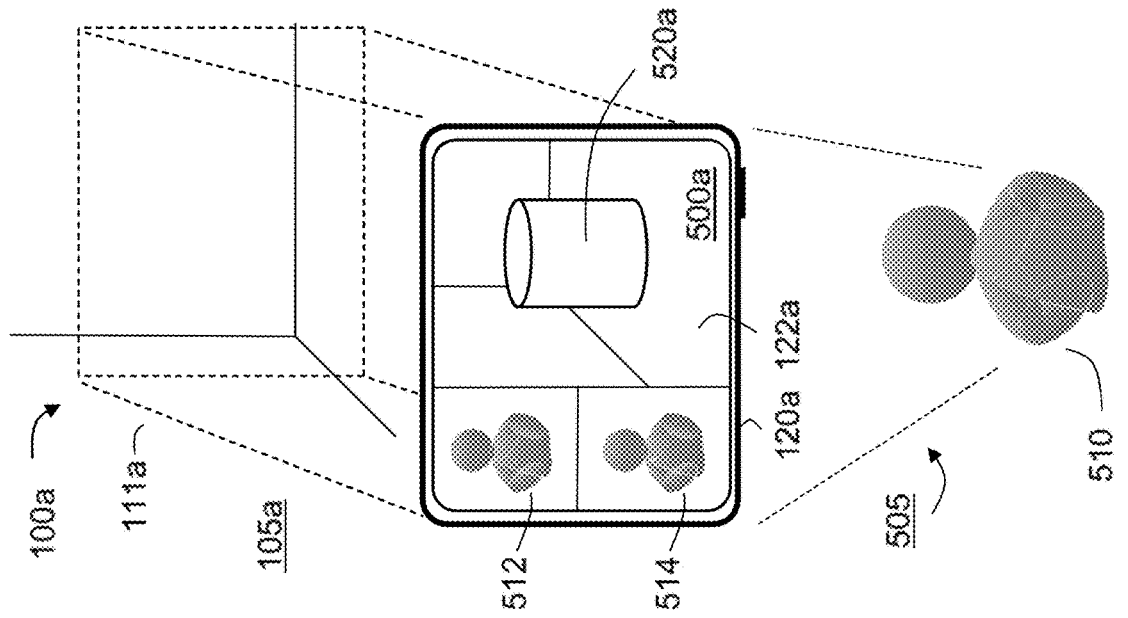

As shown in FIG. 5B, in response to detecting the public voice command 520u from the user 510 at the volume level 526u that is above the volume threshold 524, the electronic device 120a presents the object 520a within the viewable environment 500a. Concurrently, in response to detecting the public voice command 520u from the user 510 at the volume level 526*u* above the volume threshold 524, the electronic device 120*b* presents the object 520*b* within the viewable environment 500*b*. For example, in response to the user 510 making the public voice command 520*u*, "Assistant, show me the Eiffel Tower," a visual representation of the Eiffel Tower is presented within the viewable environment 500*a* of the user 510 associated with the electronic device 120*a* and the viewable environment 500*b* of the user 512 (or any other user) associated with the electronic device 120*b*.

Figure 5C:
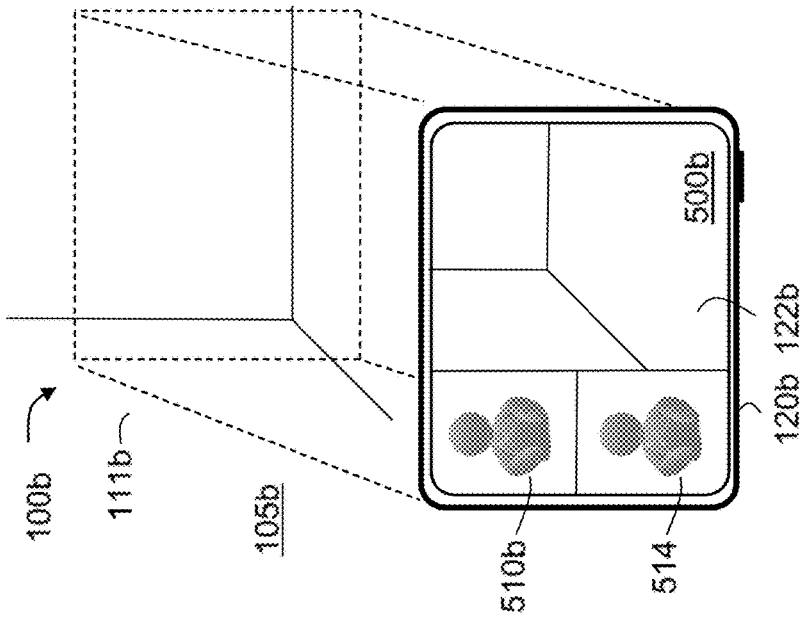
Figure 5C:
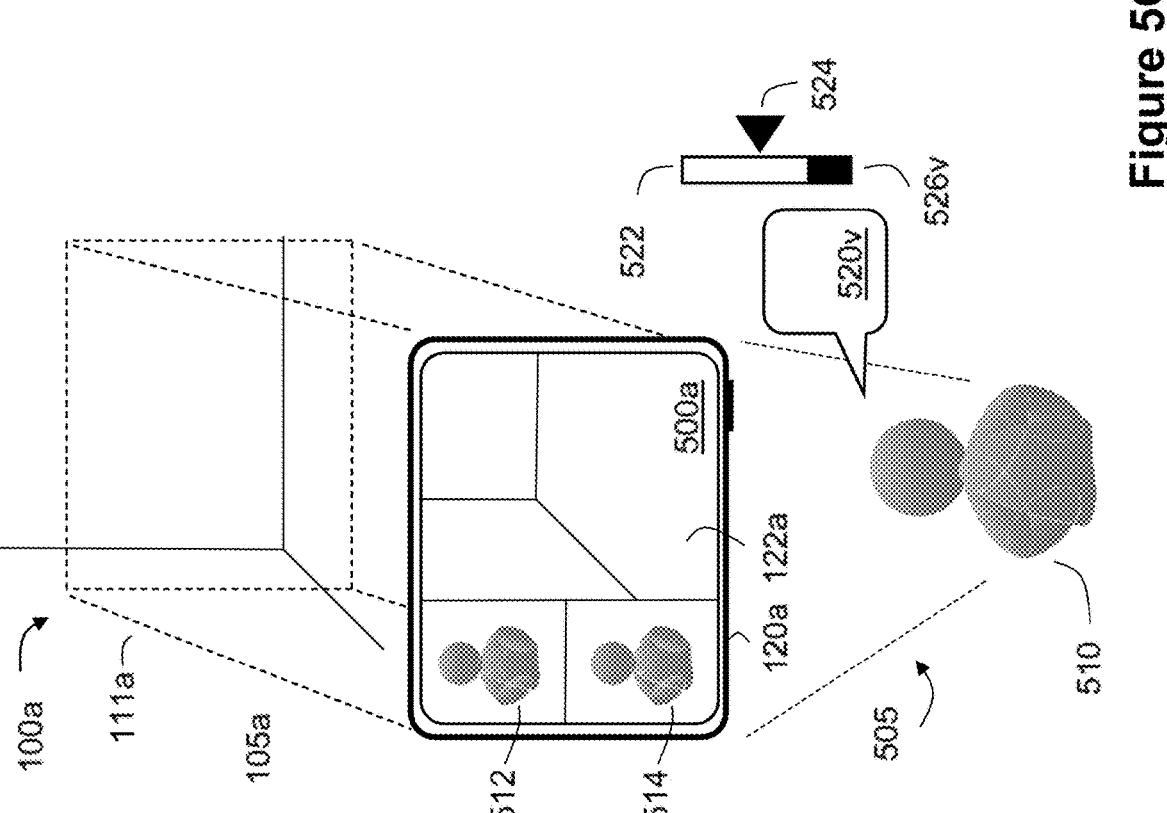

As shown in FIG. 5C, the user 510 invokes a private interaction based on a private voice command 520*v* within a volume range 522. In some implementations, the private voice command 520*v* includes, but is not limited to, a user search input to a digital assistant made at a volume level 526*v* below a volume threshold 524. For example, the user 510 may invoke a search query below the volume threshold 524 at a whisper or hoarse level, with the command, "Assistant, show me the Eiffel Tower."

Alternatively, in some implementations, the private voice command 520*v* includes, but is not limited to, a user invocation input made below the volume threshold 524, at the volume level 526*v*. For example, the user 510 may invoke the digital assistant with the command, "Hey, Assistant," below the volume threshold 524.

Figure 5D:
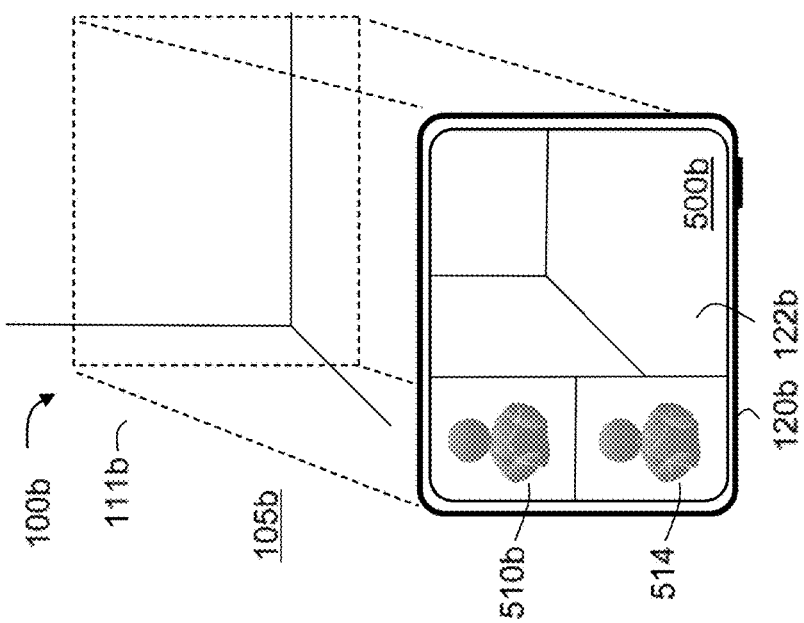
Figure 5D:
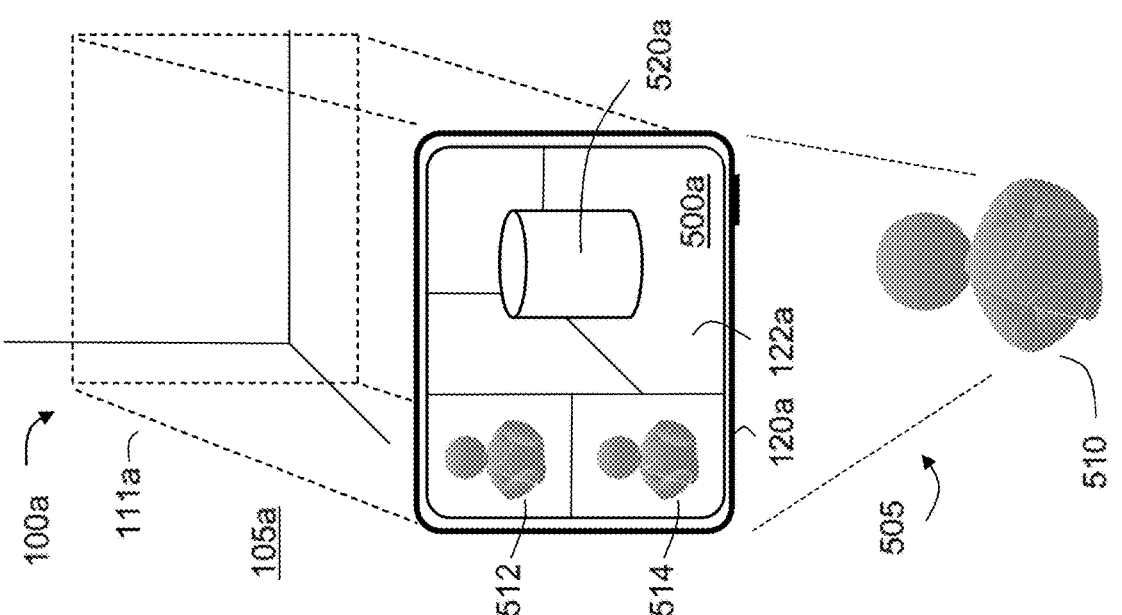

As shown in FIG. 5D, in response to detecting the private voice command 520*v* from the user 510 at the volume level 526*v* below the volume threshold 524, the electronic device 120*a* presents the object 520*a* within viewable environment 500*a*. Concurrently, in response to detecting the private voice command 520*v* from the user 510, the electronic device 120*b* presents no object or response within the viewable environment 500*b*. For example, in response to the user 510 making a private voice command, "Assistant, show me the Eiffel Tower," a visual representation of the Eiffel Tower is presented only the within the viewable environment 500*a* of the user 510 associated with the electronic device 120*a*. The electronic device 120*b*, however, forgoes presenting any object or response within the viewable environment 500*b*.

As shown in FIGS. 6A-6D, a gaze-driven CGR presentation scenario includes one electronic device 120*a* associated with a first user 610. In some implementations, the display 122*b* includes one or more avatars or images of the user 610*a*, associated with the electronic device 120*a*. FIGS. 6A-6D are similar to and adapted from FIGS. 5A-5D. Therefore, similar reference numbers are used therebetween and only the differences are described herein for the sake of brevity.

Figure 6A:
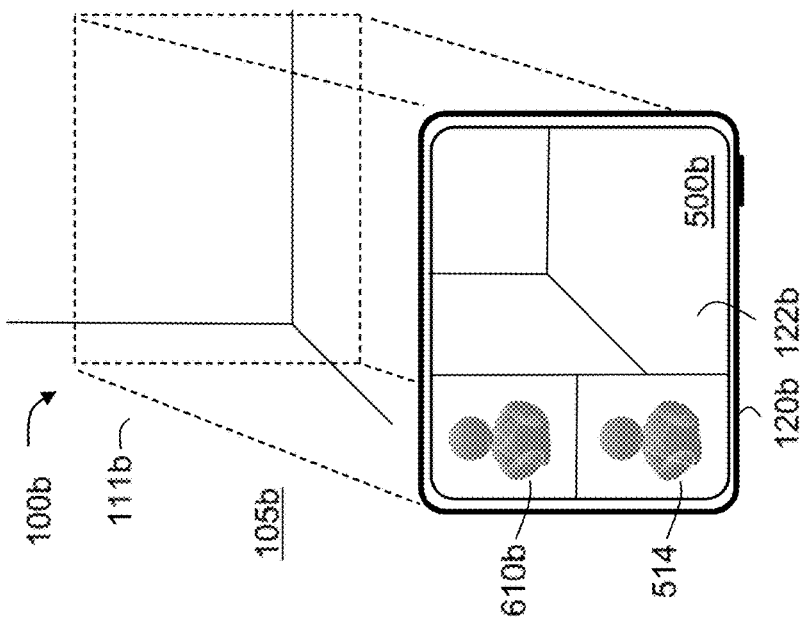
FIGS. 6A-6D illustrate a sequence of instances for invoking public and private interactions during a multiuser communication session based on gaze direction in accordance with some implementations.
Figure 6A:
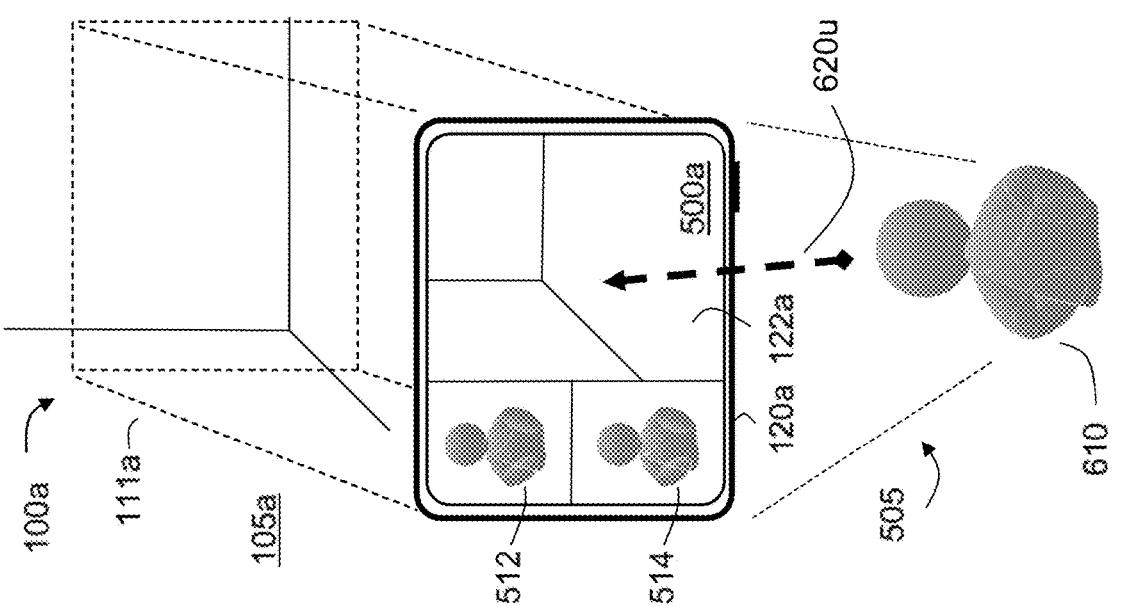

As shown in FIG. 6A, the user 610 invokes a public interaction based on a public gaze direction command 620*u*. In some implementations, the electronic device 120*a* concurrently detects the public gaze direction command 620*u* and a user search input to a digital assistant at any volume threshold or level. For example, the user 610 may provide a user search input while gazing at or near a portion of the display 122*a* with the command, "Assistant, show me the Eiffel Tower." In some implementations, a user gaze directed at the viewable area 500*a* comprises the public gaze direction command 620*u*. It is to be understood that a gaze direction command may override or complement volume-based public-private interaction thresholds according to one or more environmental factors, hardware factors, user factors, or the like as discussed above with respect to the volume threshold 524. In some implementations, background noise or crosstalk may make audio-driven public-private interaction invocation unreliable or impractical. In this scenario, gaze-driven public-private interaction invocation may replace or augment audio driven public-private interaction invocation.

Alternatively, in some implementations, the public gaze direction command 620*u* includes, but is not limited to, a user invocation input made at any level with respect to the volume threshold 524. For example, the user 610 may invoke the digital assistant with the command, "Hey, Assistant."

Figure 6B:
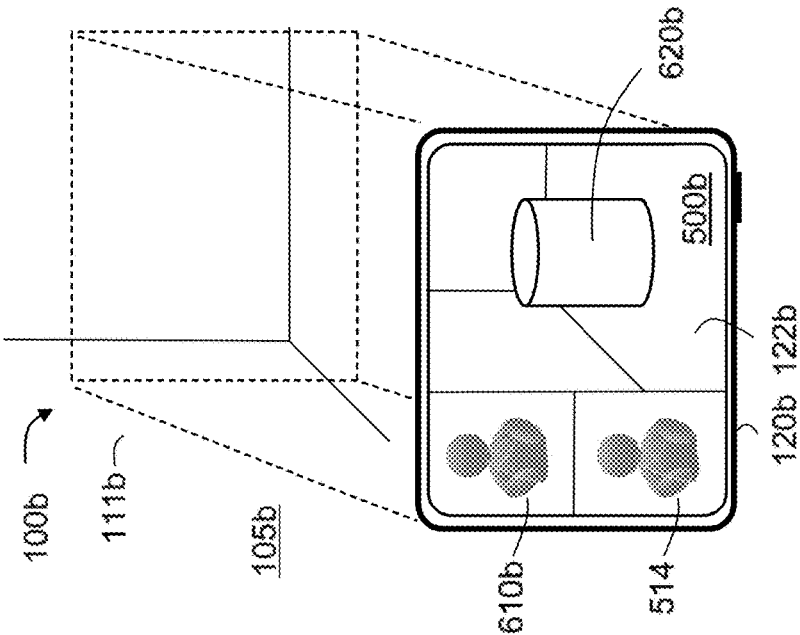

As shown in FIG. 6B, in response to detecting the public gaze direction command 620*u* from the user 610 while also detecting the user search input, the electronic device 120*a* presents the object 620*a* in the viewable environment 500*a*. Concurrently, in response to detecting the public gaze direction command 620*u* from the user 610 while also detecting the user search input, the electronic device 120*b* presents the object 620*b* in the viewable environment 500*b*. For example, in response to the user 510 providing the voice command, "Assistant, show me the Eiffel Tower," while gazing at the electronic device 120*a*, the electronic device 120*a* presents a visual representation of the Eiffel Tower within the viewable environment 500*a* of the user 610 associated with the electronic device 120*a*. The electronic device 120*b* also presents the visual representation of the Eiffel Tower within the viewable environment 500*b* associated with the user 512 (or any other user). In some implementations, gaze direction may invoke a gaze-only public command. For example, the public gaze direction command 620*u* of the user 610 may be directed at a particular region or object in the viewable environment associated with a particular search. For example, a region of the viewable environment 500*a* may be associated with a document or slide, and the electronic devices 120*a* and 120*b* may respectively present the document or slide as objects 620*a* and 620*b*.

Figure 6C:
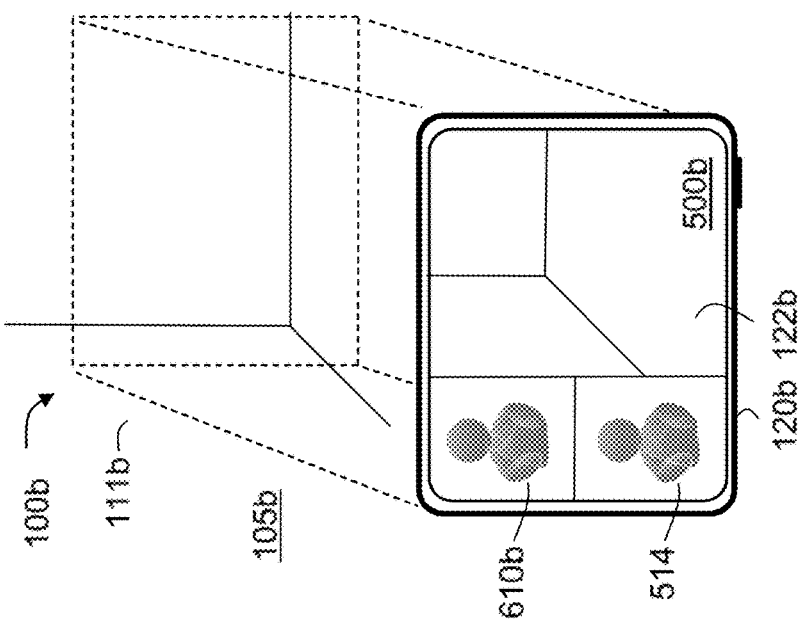
Figure 6C:
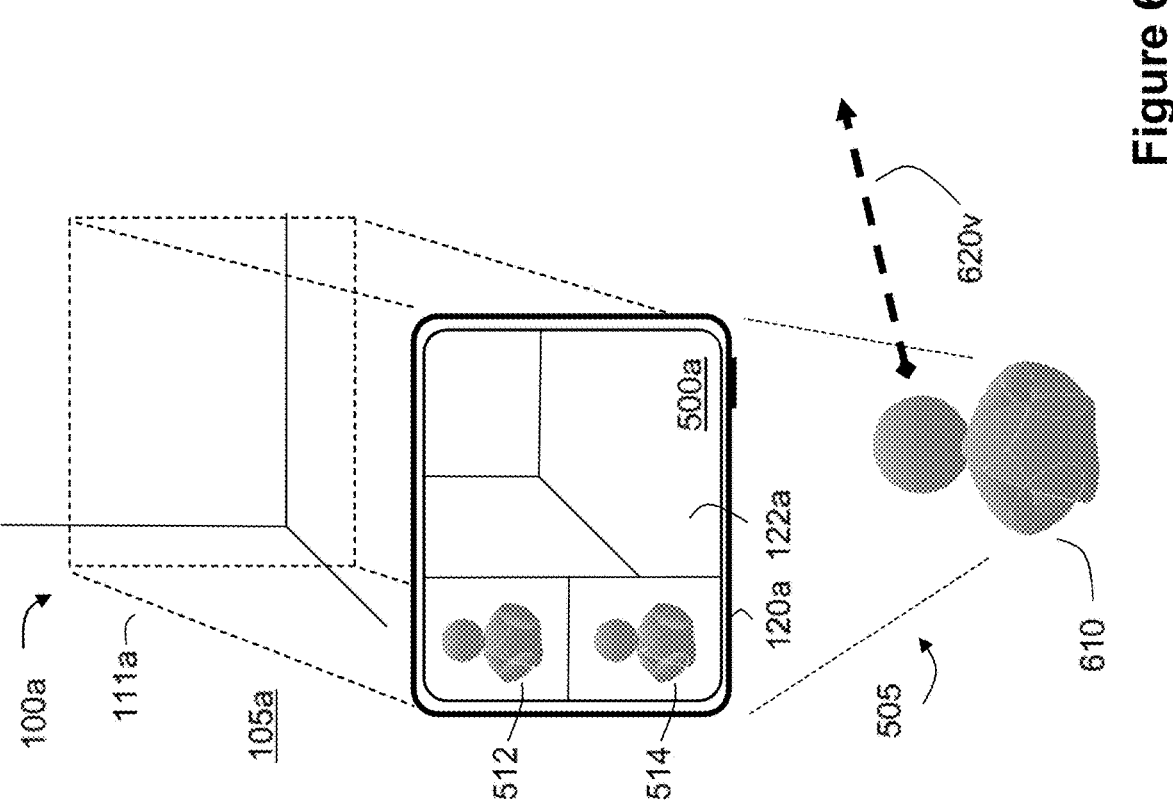

As shown in FIG. 6C, the user 610 invokes a private interaction based on a private gaze direction command 620*v*. In some implementations, the electronic device 120*a* concurrently detects the private gaze direction command 620*v* and a user search input to a digital assistant at any volume threshold or level. For example, the user 610 may provide a search input while gazing away from a portion of the display 122*a* or at a designated portion of the display 122*a* reserved for private interactions, with the command, "Assistant, show me the Eiffel Tower." In some implementations, a user gaze directed away from the viewable area 500*a* comprises the private gaze direction command 620*v*. In some implementations, a user gaze directed toward the user 512 or the user 514 presented on the electronic device 120*a* comprises the private gaze direction command 620*v*.

Alternatively, in some implementations, the private gaze direction command 620*v* includes, but is not limited to, a user invocation input made at any level with respect to the volume threshold 524. For example, the user 610 may invoke the digital assistant with the command, "Hey, Assistant."

Figure 6D:
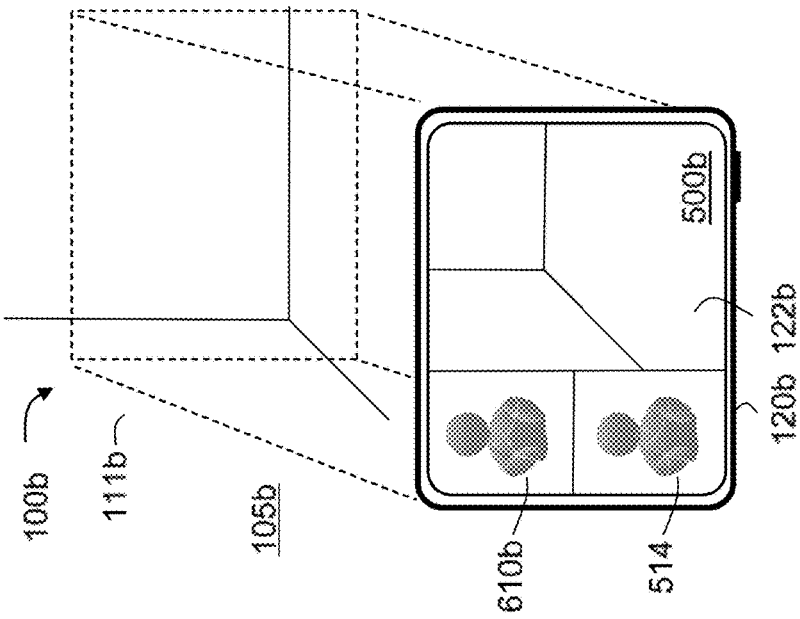

As shown in FIG. 6D, in response to detecting the private gaze direction command 620*v* from user 610 while also detecting the user search input, the electronic device 120*a* presents object 520*a* in viewable environment 500*a*. Concurrently, in response to detecting the private gaze direction command 620*v* from user 610 while also detecting the user search input, the electronic device 120*b* presents no object or response in the viewable environment 500*b*. For example, the user 610 provides the voice command, "Assistant, show me the Eiffel Tower," while gazing generally at the electronic device 120*a*, a particular region or portion thereof, or at a particular physical or virtual object within the viewable environment 500*a*. In response, the electronic device 120*a* presents a visual representation of the Eiffel Tower only within the viewable environment 500*a* of the user 610 associated with the electronic device 120*a*, while the electronic device 120*b* forgoes presenting any object or response within the viewable environment 500*b*.

In some implementations, the private gaze direction command 620*v* is sufficient alone to invoke a private or semi-public interaction. In some implementations, the private gaze direction command 720*v* is paired with a private voice command to invoke a private or semi-public interaction. In some implementations, the private gaze direction command 720*v* with a voice command above volume threshold 524 will invoke a semi-public interaction. In some implementations, a public gaze direction command with a voice command below volume threshold 524 will invoke a semi-public interaction.

As shown in FIGS. 7A-7D, a gesture-driven CGR presentation scenario includes one electronic device 120*a* associated with a first user 710. In some implementations, the display 122*b* includes one or more avatars or images of the user 710*a*, associated with the electronic device 120*a*. FIGS. 7A-7D are similar to and adapted from FIGS. 5A-5D. Therefore, similar reference numbers are used therebetween and only the differences are described herein for the sake of brevity.

Figure 7A:
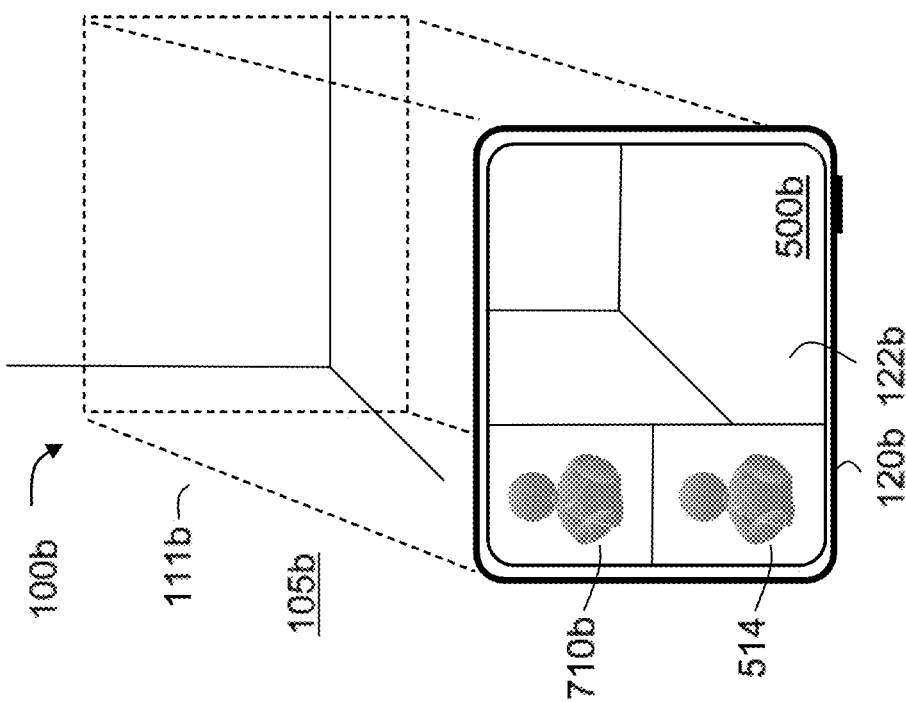
FIGS. 7A-7D illustrate a sequence of instances for invoking public and private interactions during a multiuser communication session based on the presence or absence of a hand gesture in accordance with some implementations.
Figure 7A:
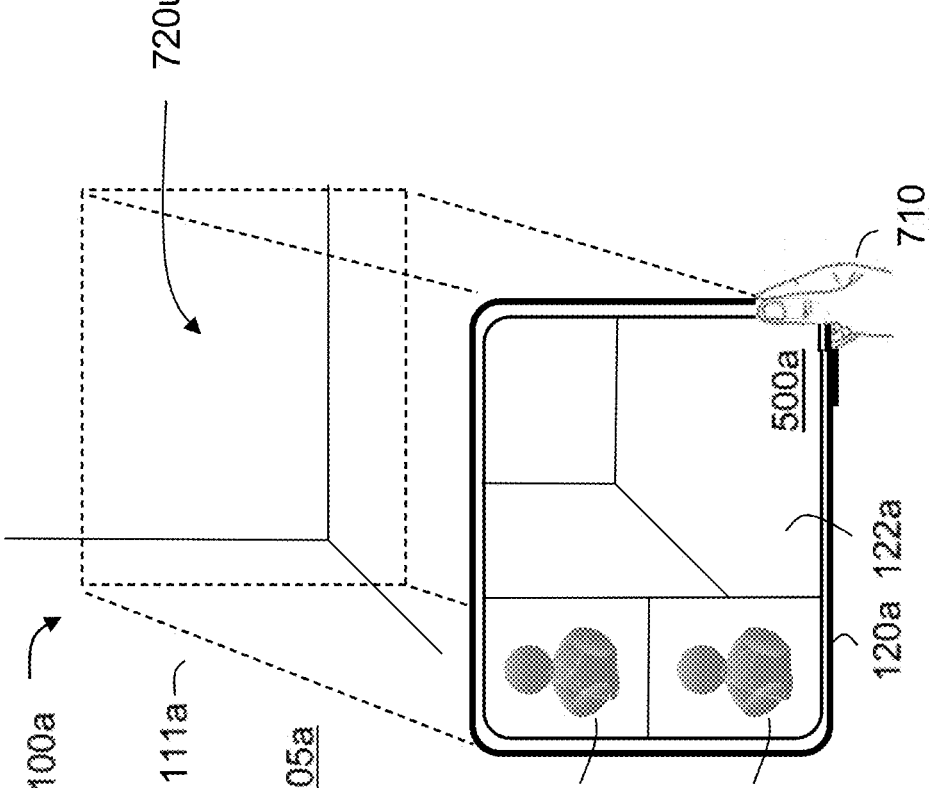

As shown in FIG. 7A, the user 710 invokes a public interaction based on the absence 720*u* of a hand gesture within the FOV 111*a*. In some implementations, the electronic device 120*a* concurrently detects the absence 720*u* of a hand gesture within the FOV 111*a* and a user search input to a digital assistant at any volume threshold or level. For example, user 710 may invoke a user search input while not gesturing or placing any body part within FOV 111*a*, while speaking the command, "Assistant, show me the Eiffel Tower."

Alternatively, in some implementations, the absence 720*u* of the hand gesture includes, but is not limited to, a user invocation input made at any level with respect to the volume threshold 524. For example, the user 710 may invoke the digital assistant with the command, "Hey, Assistant."

It is to be understood that hand gesture input may override or complement or more of volume-based and gaze-based public-private interaction thresholds according to one or more environmental factors, hardware factors, user factors, or the like as discussed above with respect to the volume threshold 524. In some implementations, background noise or crosstalk may make audio-driven public-private interaction invocation unreliable or impractical. In this scenario, gesture-driven public-private interaction invocation may replace or augment audio driven public-private interaction invocation.

Figure 7B:
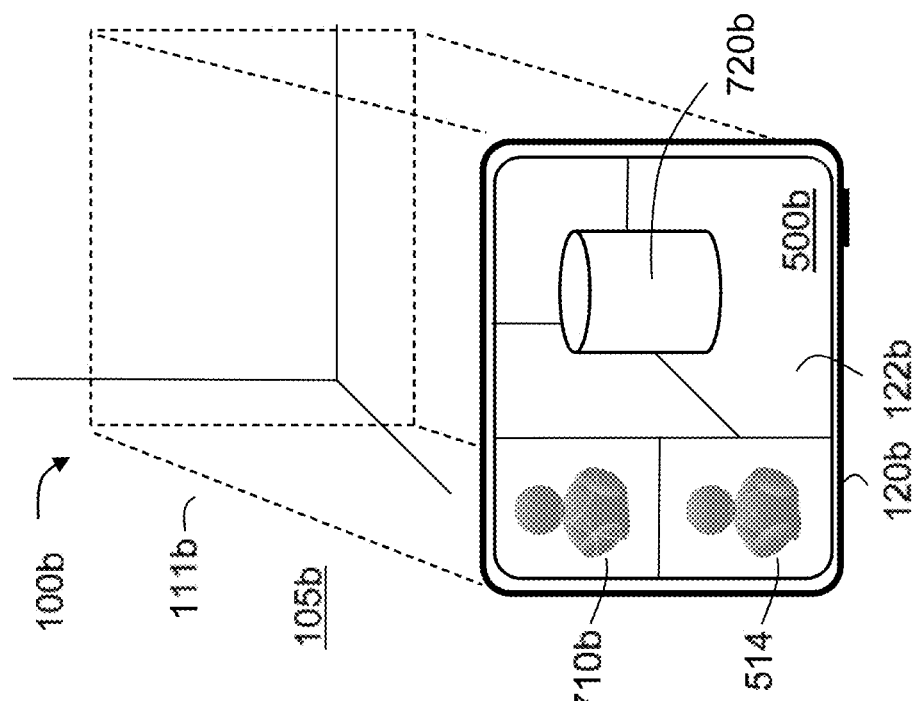
Figure 7B:
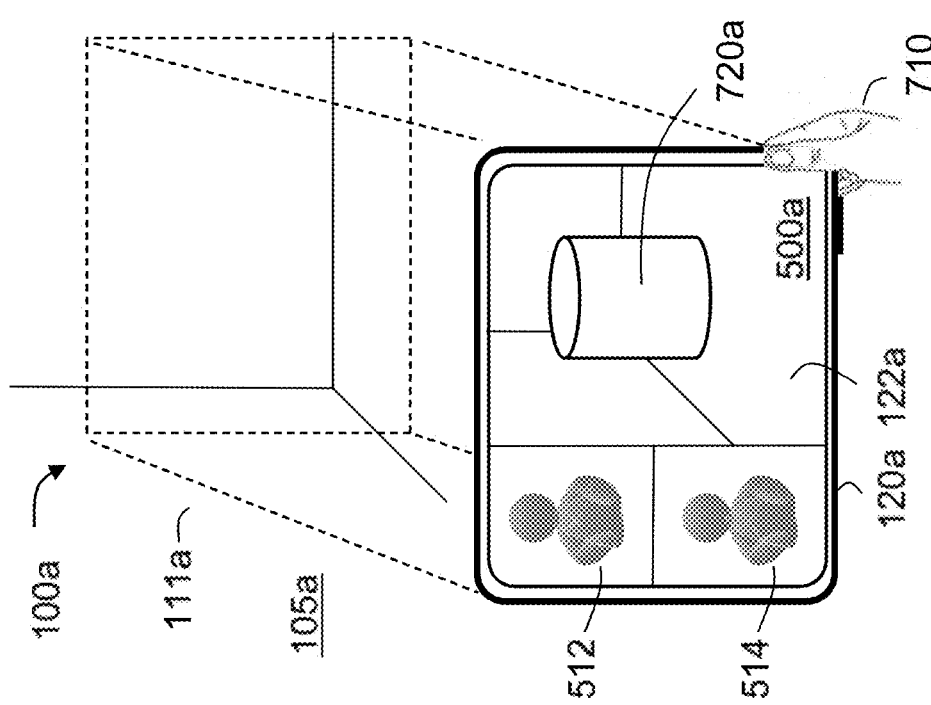

As shown in FIG. 7B, in response to detecting the absence 720*u* of the hand gesture within the FOV 111*a* while also detecting the user search input, the electronic device 120*a* presents the object 720*a* in the viewable environment 500*a*. Concurrently, in response to detecting the absence 720*u* of the hand gesture within the FOV 111*a* while also detecting the user search input the electronic device 120*b* presents object 720*b* in the viewable environment 500*b*. For example, in response to the absence 720*u* of the hand gesture within the FOV 111*a* with the voice command, "Assistant, show me the Eiffel Tower," a visual representation of the Eiffel Tower is presented within the viewable environment 500*a* of the user 710 associated with the electronic device 120*a* and the viewable environment 500*b* of the user 512 (or any other user) associated with the electronic device 120*b*. In some implementations, the user 710 may invoke a public interaction with a public hand gesture different from the private hand gesture 720*v* shown in FIGS. 7C-7D. Exemplary public hand gestures include, but are not limited to, pointing, waving, or the like.

Figure 7C:
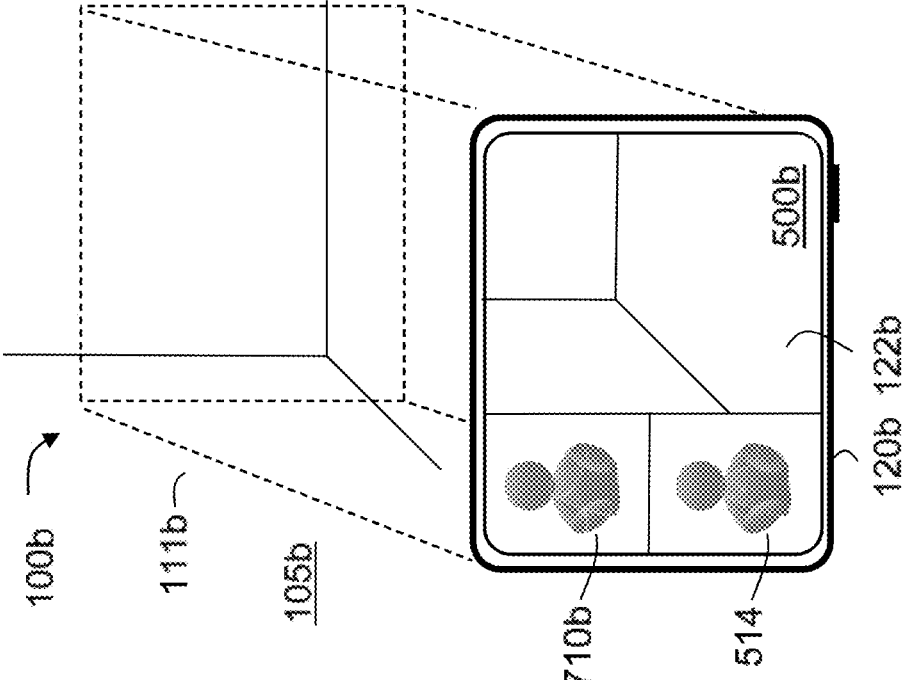
Figure 7C:
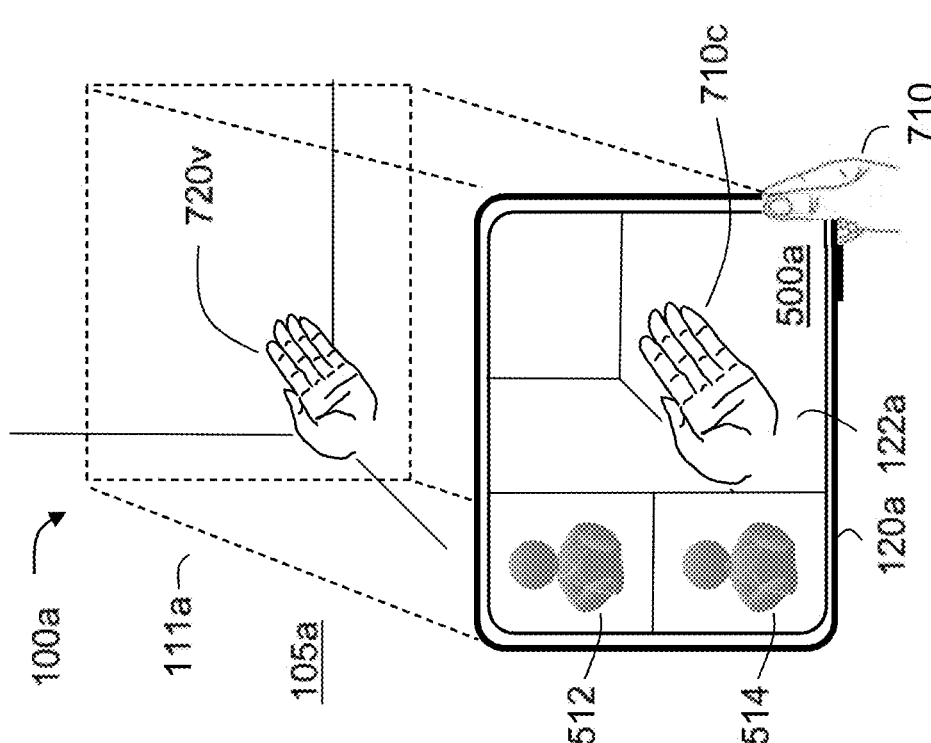

As shown in FIG. 7C, the user 710 invokes a private interaction based on a private hand gesture command 720*v* within the FOV 111*a*. In some implementations, the electronic device 120*a* concurrently detects the private hand gesture command 720*v* within the FOV 111*a* and a user search input to a digital assistant at any volume threshold or level. For example, the user 710 may invoke a user search input while holding a hand 720*v* within FOV 111*a* of electronic device 120*a*, with the command, "Assistant, show me the Eiffel Tower." In some implementations, a private gesture command could include the user 710 covering their mouth with their hand 720*v*, or placing their hand substantially near their mouth with the palm facing the lips to approximate or literally obscure more or more spoken or mouthed words or one or more facial expressions including, but not limited to, a smile, frown, or the like. In some implementations, the electronic device 120*a* detects the private hand gesture command 720*v* within a field of view of a user-facing camera as shown by example in FOV 505 in FIGS. 5A-5D.

Alternatively, in some implementations, the private hand gesture command 720*v* includes, but is not limited to, a user invocation input made at any level with respect to the volume threshold 524. For example, the user 710 may invoke the digital assistant with the command, "Hey, Assistant."

Figure 7D:
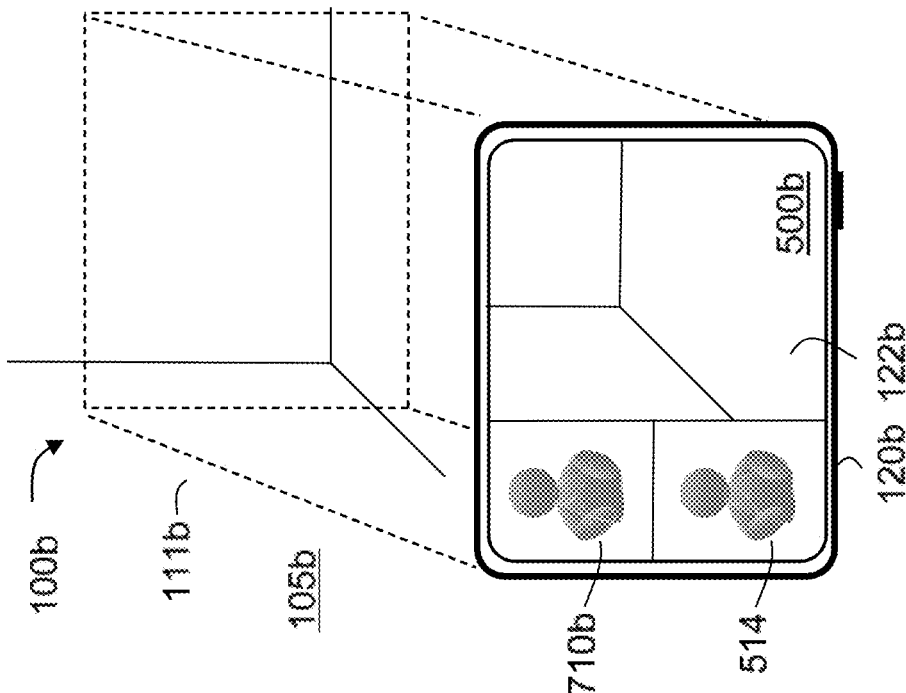
Figure 7D:
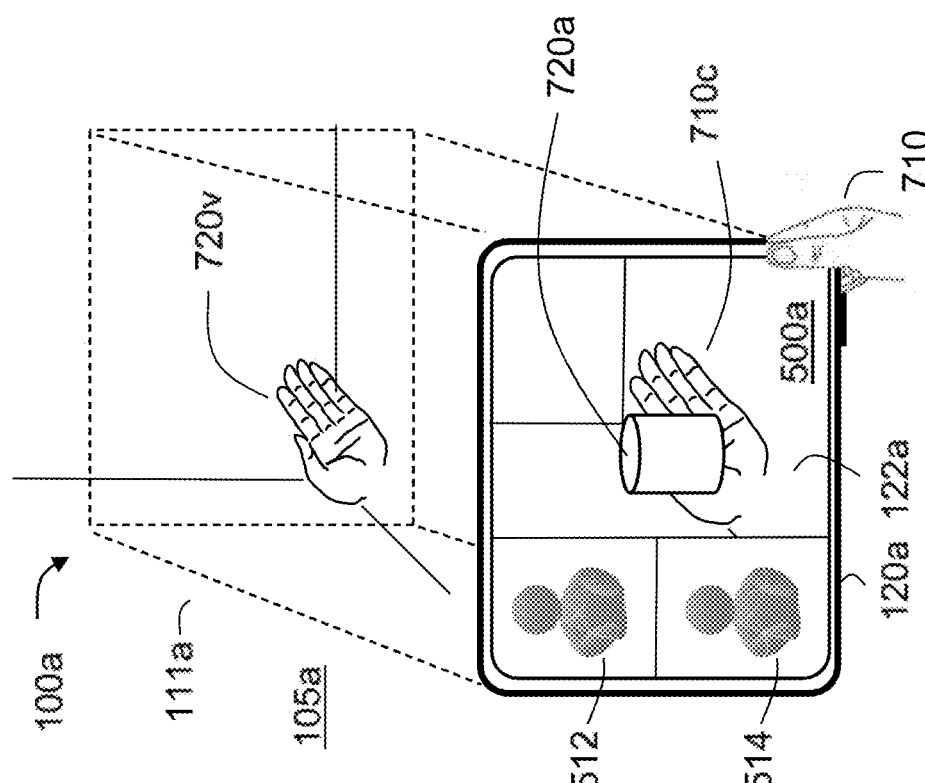

As shown in FIG. 7D, in response to detecting the private hand gesture command 720*v* within the FOV 111*a* while also detecting the user search input, the electronic device 120*a* presents the object 720*a* in the viewable environment 500*a*. Concurrently, in response to detecting the private hand gesture command 720*v* within the FOV 111*a* while also detecting the user search input, the electronic device 120*b* presents no object or response in viewable environment 500*b*. For example, the user 710 makes a private gesture command with the voice command, "Assistant, show me the Eiffel Tower." In response, the electronic device 120*a* presents a visual representation of the Eiffel Tower only within the viewable environment 500*a* of the user 710 associated with the electronic device 120*a*. The electronic device 120*b*, however, forgoes presenting any object or response within the viewable environment 500*b*.

In some implementations, object 720*a* is presented proximate to or overlaid upon a visual representation 710*c* of the private hand gesture command 720*v* of the user 710. In some implementations, the object 720*a* is presented parallel to or orthogonal to a plane aligned with the visual representation 710*c* of the private hand gesture command 720*v*. For example, the user 710 may make a private hand gesture command 720*v* in which the palm of hand 710*v* is oriented substantially vertically with the voice command, "Assistant, show me the Eiffel Tower." In response, a visual representation of the Eiffel Tower is presented in front of a plane parallel to the palm of hand 710*v*. For another example, the user 710 may make a private hand gesture command 720*v* in which the palm of hand 710*v* is oriented substantially flat and pointing upward with the voice command, "Assistant, show me the Eiffel Tower." In response, a visual representation of the Eiffel Tower is presented over a plane orthogonal to the palm of hand 710*v*, giving the appearance that the user 710 is holding a CGR model of the Eiffel Tower in the visual representation 710c of flat, upward palm 720v. It is to be understood that electronic device 120a or 120b may overlay any or all of virtual object 520a, 520b, 620a, 620b, 720a, and 720b on any physical object or surface respectively within the viewable environment 500a or 500b.

In some implementations, the objects 520a, 520b, 620a, 620b, 720a, and 720b include one or more distinct or identical objects, may include one or more distinct or identical objects associated therewith, and may include one or more distinct or identical visual characteristics. In some implementations, the objects 520a, 520b, 620a, 620b, 720a, and 720b may appear identical or distinct from each other based on characteristics of one or more of the users 510, 610, 710, 512, 514, or other users. In some implementations, the objects 520a, 520b, 620a, 620b, 720a, and 720b may appear identical or distinct from each other based on characteristics of one or more of the viewable environments 500a or 500b, including, but not limited to, whether the viewable environments 500a and 500b are associated with the same physical environment 105.

In some implementations, a private gesture command is sufficient alone to invoke a private or semi-public interaction. In some implementations, a private hand gesture command is paired with a private voice command or private gaze direction command to invoke a private or semi-public interaction. In some implementations, a private hand gesture command 720v with a voice command above volume threshold 524 or a public gaze direction command 620u will invoke a semi-public interaction. In some implementations, the absence 720u of a hand gesture within the FOV 111a with a voice command below the volume threshold 524 or a private gaze direction command 620v will invoke a semi-public interaction.

In some implementations, modifying an avatar of the user includes obscuring the user's visual presentation to other users, e.g., pixelating, blurring, or animating an avatar or video presentation of the user. In some implementations, as shown in FIGS. 7C and 7D, the electronic device 120b may modify the video presentation 710b of the user 710 at the electronic device 120b in response to the electronic device 120a receiving the private hand gesture command 720v. In some implementations, the electronic device 120b may modify the video presentation 510b or 610b in response to receiving the private voice command 520v or the private gaze direction command 620v. In some implementations, modifying an indicator associated with the user, e.g., transmitting a status indicator to other users that a user is invoking a private or semi-public interaction. In some implementations, the user device may not itself modify its communication, but may transmit a modification instruction to another user device or to a communication controller local to or remote from the user device. The modification instruction may instruct another node, module, or device to modify the user's communication when received.

Figure 8:
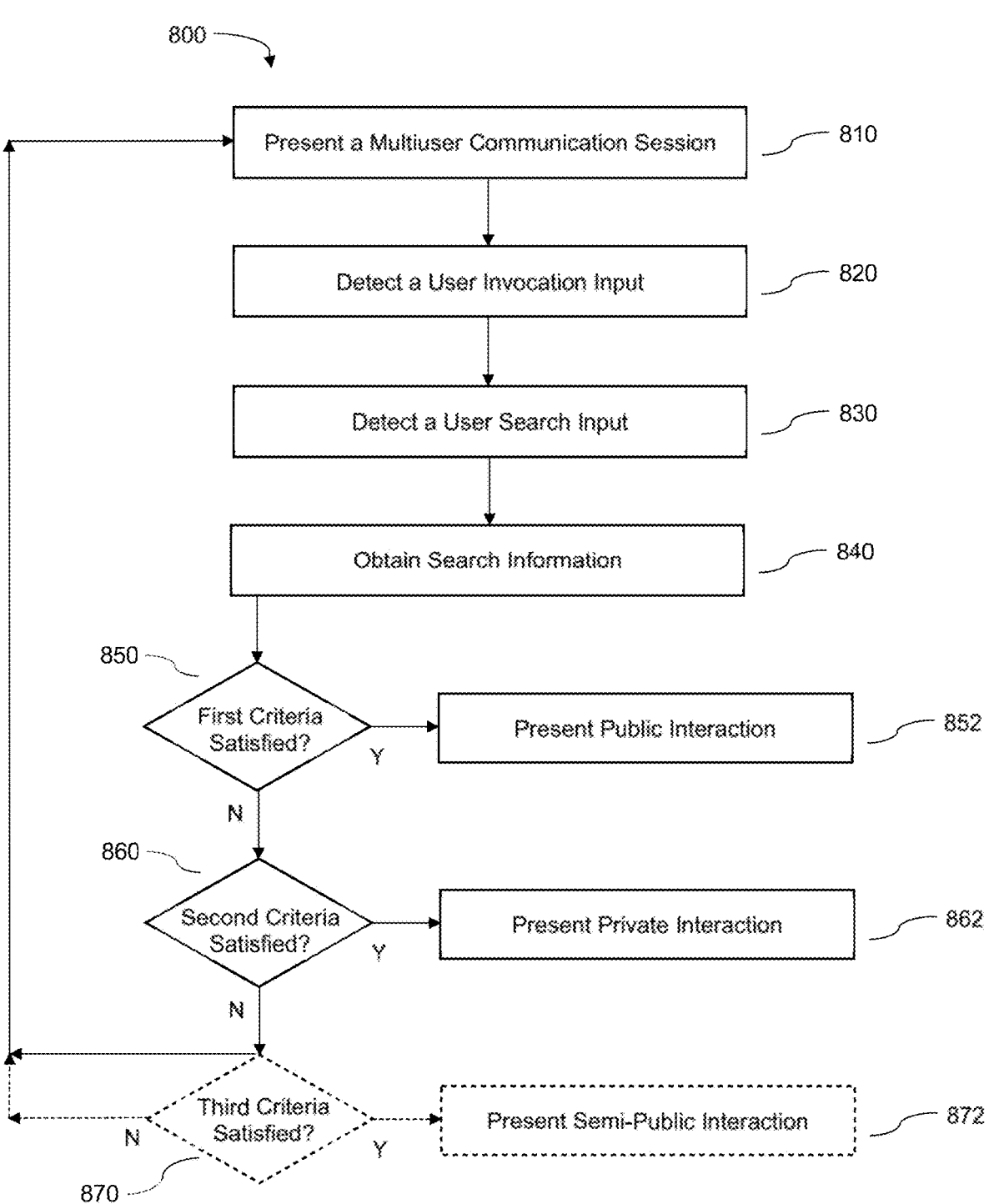
FIG. 8 is a flowchart representation of a method of invoking public and private interactions during a multiuser communication session in accordance with some implementations.

FIG. 8 is a flowchart representation of a method 800 of invoking public and private interactions during a multiuser communication session in accordance with some implementations. In various implementations, the method 800 is performed by a device with non-transitory memory and one or more processors coupled with the non-transitory memory (e.g., the controller 110 in FIGS. 1 and 2; the electronic device 120 in FIGS. 1 and 3; or a suitable combination thereof), or a component thereof. In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

As described above, during a multiuser communication session (e.g., a teleconference, a videoconference, a CGR conference, or the like), a user may request information (e.g., a voice request). Current methods cannot determine whether the output of the request should be shared with (A) all users of the multiuser communication session (i.e., a public interaction) or (B) only the requesting user (i.e., a private interaction). Thus, according to some implementations, the method described herein will receive a request and, depending on state or movement of a requesting user, respond publicly to all users of the multiuser communication session or privately to a subset of the users of the multiuser communication session.

As represented by block 810, the method 800 includes presenting a multiuser communication session. In some implementations, the electronic device 120, 120a or 120b displays a multiuser communication session respectively including the viewable environment 100, 500a or 500b, and, optionally, one or more users, including, but not limited to, the user 510, 610 or 710 associated with the electronic device 120a and the users 512 and 514 associated with electronic devices in communication therewith. In some implementations, a multiuser communication session includes a substantially real-time video or audio teleconference conducted over an Internet protocol (IP) network between the electronic device 120 or 120a and other electronic devices in communication therewith. In some implementations, the CGR environment includes virtual reality (VR) content and avatars representing users. In some implementations, the CGR environment includes augmented reality (AR) content with video imagery of one or more users combined with at least one of a fully or partially virtual environment. In some implementations, the CGR environment includes AR content with video imagery of one or more users in the natural environment of the one or more users. In some implementations, the CGR environment includes a cloud-based 2D or 3D rendered system, a cloud-based teleconferencing or videoconferencing system, or a near-eye display system. In some implementations, multiuser communication session handler 232 or 332 is configured to present the multiuser communication session in accordance with the block 810.

As represented by block 820, the method 800 includes detecting a user invocation input. In some implementations, a user invocation input includes one or more of environmental audio input, speech content input, hand gesture, body movement, body position relative to the electronic device 120, body posture, orientation of one or more fingers or digits, gaze of one or more eyes, direction of one or more eyes, dilation of one or more eyes, volume of voice input, timbre or modulation of voice input including whispering or emotion, or the like. In some implementations, an invocation input is a 'wake word' or 'wake phrase' spoken by a user that indicates the start of or prefixes a search request, or a predetermined gesture. In some implementations, the predetermined gesture is the user's hand raised in front of the user's mouth or face. In some implementations, the predetermined gesture includes facing the user's palm toward the user's face to create a substantially planar surface facing the user. In some implementations, one or more of the public-private interaction engine 250 and the user invocation handler 252 is configured to detect a user invocation input in accordance with the block 820.

As represented by block 830, the method 800 includes detecting a user search input. In some implementations, user search input includes a spoken search query received by a digital assistant, one or more gestures in American Sign Language (ASL) or another sign language, or a text search query received at a physical or software keyboard. In some implementations, the user search input is detected via at least one of a hand tracking engine, body pose engine, gaze tracking engine, natural language processor, and/or the like. In some implementations, detecting the user search input may include receiving the user's search query and other detected state of the user, such as a camera input, a microphone input other than the content of spoken input, or other metadata. In some implementations, one or more of the public-private interaction engine 250 and the user search handler 254 is configured to detect a user search input in accordance with the block 830. In some implementations, a user search input comprises one or more interrogative or imperative words, statements, phrases, or the like. As one example, a user search input may be the question, "Assistant, what is the tallest structure in Paris?" As another example, a user search input may be the statement, "Assistant, show me the tallest structure in Paris." As yet another example, a user search input may be the phrase "Eiffel Tower."

As represented by block 840, the method 800 includes obtaining search information. In some implementations, search information includes results from an Internet-based search engine associated with a digital assistant. In some implementations, obtaining includes one or more of receiving data or metadata from an external device, node, or server; retrieving data or metadata from a local memory or an external device, node or server; or generating data or metadata at a local device. In some implementations, an electronic device submits a search request to a centrally managed multiuser search engine or digital assistant and receives a complete search query. In some implementations, an electronic device submits a user search input to a local or remote search engine or digital assistant. In some implementations, one or more of the public-private interaction engine 250 and the user search handler 254 is configured to detect a user search input in accordance with the block 840.

As represented by block 850, the method 800 includes determining whether first criteria are satisfied. In some implementations, first criteria include one or more of voice input criteria, gaze input criteria, and gesture input criteria, as respectively shown by example in FIGS. 5A-5D, FIGS. 6A-6D, and FIGS. 7A-7D. As one example, the first criteria are satisfied in response to detecting the public voice command 520*u* spoken at or above a speaking volume and/or timbre as shown in FIGS. 5A and 5B. As another example, the first criteria are satisfied in response to detecting the public gaze direction command 620*u* substantially toward the display 122*a* of the electronic device 120*a* as shown in FIGS. 6A and 6B. As yet another example, the first criteria are satisfied in response to detecting the absence 720*u* of a body or hand within the FOV 111*a* of the electronic device 120*a* as shown in FIGS. 7A and 7B.

In some implementations, one or more of these exemplary first criteria may take precedence over another one or more of the exemplary first criteria according to environmental, hardware, or user preferences. In some implementations, a first request type includes a public interaction mode in which the response to the request for information is shared with all users participating in the multiuser communication session. In some implementations, first input criteria may include one or more visual or audio cues from a user indicating a first request type, e.g., a user's body oriented in a standard posture, a user's voice at a standard modulation or volume, or a user speaking a distinct command to indicate a first request type. In some implementations, public-private interaction engine 250 is configured to determine whether first criteria are satisfied in accordance with block 850.

As represented by block 852, method 800 includes presenting a public interaction in accordance with a determination that first criteria are satisfied at the block 850. In some implementations, presenting a public interaction includes presenting the object 520*a*, 620*a*, or 720*a* within the viewable environment 500*a* of the electronic device 120*a*, and presenting the object 520*b*, 620*b*, or 720*b* within the viewable environment 500*b* of the electronic device 120*b*. In some implementations, at least one of the CGR experience engine 240, the CGR content engine 246, the CGR presentation engine 340, and the CGR presenter 346 is configured to present a public interaction in accordance with the block 852.

As represented by block 860, the method 800 includes determining whether second criteria are satisfied. In some implementations, second criteria include one or more of voice input criteria, gaze input criteria, and gesture input criteria, as respectively shown by example in FIGS. 5A-5D, FIGS. 6A-6D, and FIGS. 7A-7D. As one example, the second criteria are satisfied by a private voice command 520*v* spoken below a speaking volume and timbre or at a whisper. As another example, the first criteria are satisfied by the private gaze direction command 620*v* substantially away from the display 122*a* of the electronic device 120*a* or directed toward a predetermined portion of the display 122*a* of the electronic device 120*a*. As yet another example, second criteria are satisfied by a private hand gesture command 720*v* located within FOV 111*a* of the electronic device 120*a*. As yet another example, the second criteria are satisfied by a hand raised forward with palm facing a camera of the electronic device.

In some implementations, one or more of these exemplary second criteria may take precedence over another one or more of the exemplary first or second criteria according to environmental, hardware, or user preferences. In some implementations, second input criteria include a particular hand gesture with the user's arm at least partially outstretched in front of the user with the palm facing toward the user. In some implementations, augmented reality content may be presented on or near the palm in alignment with the plane created by the palm. Similarly, augmented reality objects may be presented on other planes associated with other gestures or body parts. In some implementations, the public-private interaction engine 250 is configured to determine whether second criteria are satisfied in accordance with the block 860.

As represented by block 862, the method 800 includes presenting a private interaction in accordance with a determination that second criteria are satisfied at the block 860. In some implementations, presenting a private interaction includes presenting the object 520*a*, 620*a*, or 720*a* within the viewable environment 500*a* of the electronic device 120*a*, and forgoing presenting the object 520*b*, 620*b*, or 720*b* within the viewable environment 500*b* of the electronic device 120*b*. In some implementations, at least one of the CGR experience engine 240, the CGR content engine 246, the CGR presentation engine 340, and the CGR presenter 346 is configured to present a private interaction in accordance with the block 852.

In some implementations, as represented by block 870, the method 800 optionally includes determining whether third criteria are satisfied. In some implementations, third criteria include one or more of voice input criteria, gaze input criteria, and gesture input criteria, as respectively shown by example in FIGS. 5A-5D, FIGS. 6A-6D, and FIGS. 7A-7D. In some implementations, the third criteria include one or more of a voice command 520v spoken below a speaking volume and timbre or at a whisper, a private gaze direction command 620v substantially away from the display 122a of the electronic device 120a or directed toward a predetermined portion of the display 122a of the electronic device 120a, and a private hand gesture command 720v located within the FOV 111a of the electronic device 120a. For example, with reference to FIGS. 5A-5D, the volume range 522 may include a second threshold either above or below the volume threshold 524, and the third criteria is satisfied when the volume of the search request or invocation command is between the thresholds, above both thresholds, or below both thresholds. For example, with reference to FIGS. 6A-7D, the third criteria is satisfied when the user 610 or 710 makes a hand gesture or body pose different from private hand gesture 720v or the absence 720u of a hand gesture within either or both of the FOV 111a or 505. For example, the different hand gesture or body pose may include, crossed arms, closed fist, pointing finger, a reclined or partially reclined position, or the like.

In some implementations, one or more of these exemplary third criteria may take precedence over another one or more of the exemplary first, second or third criteria according to environmental, hardware, or user preferences. In some implementations, a semi-public interaction is an optional stage of the method 800 and may comprise identical or distinct criteria from criteria for the determination of a public interaction or criteria for the determination of a private interaction. In some implementations, the public-private interaction engine 250 is configured to determine whether third criteria are satisfied in accordance with the block 870.

As represented by block 872, the method 800 includes presenting a semi-public interaction in accordance with a determination that first criteria are satisfied at the block 870. In some implementations, presenting a semi-public interaction includes presenting the object 520a, 620a, or 720a within the viewable environment 500a of the electronic device 120a, presenting the object 520b, 620b, or 720b within the viewable environment 500b of the electronic device 120b, and forgoing presenting any object or response within a viewable environment of at least one electronic device in communication with electronic device 120a through a multiuser communication session. As one example, the electronic devices 120a will respectively present the object 520a, 620a, or 720a, the electronic device 120b will respectively present the object 520b, 620b, or 720b, and at least one electronic device associated with user 514 will forgo presenting any object or response. In some implementations, at least one of the CGR experience engine 240, the CGR content engine 246, the CGR presentation engine 340, and the CGR presenter 346 is configured to present a semi-public interaction in accordance with the block 872.

In some implementations, one or more of the objects 520a, 520b, 620a, 620b, 720a, and 720b comprise a three-dimensional virtual object that may optionally be animated or articulated or associated with additional media content. For example, a presented three-dimensional model of the Eiffel Tower may also be presented with supplementary information including a spoken summary of key historical, geographical, engineering, or political facts associated with the Eiffel Tower, written material or hyperlinks to written material presented proximally therewith. In some implementations, supplementary information is presented to the user 510, 610 or 710 in accordance with a semi-public interaction and to subset of other electronic devices in communication with the electronic device 120a through a multiuser communication. In some implementations, a subset of electronic devices comprises at least one electronic device excluding the electronic device 120a, but fewer than all electronic devices in communication with the electronic device 120a through a multiuser communication session. In some implementations, the information may include audio, video, text, augmented reality objects or events, virtual reality objects or events, or other similar static or dynamic content. In some implementations, obtained information or an obtained object may include audio, video, text, augmented reality objects or events, virtual reality objects or events, or other similar static or dynamic content.

In some implementations, a physical environment is captured on video and displayed on a display with virtual or augmented reality content overlaid or composited with the video of the environment. In some implementations, presenting occurs on a handheld device, a tablet device, or other flat-screen device. In some implementations, a physical environment appears naturally through a transparent display with virtual or augmented reality content overlaid or projected on the naturally visible environment and objects therein. In some implementations, presenting occurs on eyeglasses or another other near-eye system. In some implementations, an electronic device receives AR/VR content projected within the environment. For example, a user device may request to view the Eiffel Tower, and a 2D or 3D model of the Eiffel Tower may be presented on the user's device in response to the request.)

In some implementations, the method 800 includes: presenting a multiuser communication session that includes a first user associated with an electronic device and one or more other users associated with one or more other electronic devices; while presenting the multiuser communication session, detecting a user invocation input that corresponds to a trigger to a digital assistant; detecting a user search input that corresponds to a request for information; in response to detecting the user search input, obtaining the information based on the request; in accordance with a determination that at least one of the user invocation input and the user search input satisfy first input criteria associated with a first request type: presenting the information; and transmitting the information to the one or more other electronic devices for presentation to the one or more other users; and in accordance with a determination that at least one of the user invocation input and the user search input satisfy second input criteria associated with a second request type: presenting the information; and forgoing transmitting the information to the one or more other electronic devices for presentation to the one or more other users.

In some implementations, the method 800 includes: in accordance with a determination that at least one of the user invocation input and the user search input satisfy third input criteria associated with a third request type: presenting the information via the one or more output devices; and transmitting the information to a subset of the one or more other electronic devices for presentation to the one or more other users.

In some implementations, the method 800 includes: in accordance with the determination that at least one of the user invocation input and the user search input satisfy the second input criteria associated with the second request type, transmitting an indication of the second request type to the one or more other electronic devices. In some implementations, the indication comprises transmitting an instruction for at least one of pausing video of the requesting user, muting audio of the requesting user, modifying an avatar of the requesting user, and modifying an indicator associated with the requesting user. For example, in response to a public invocation from the user 510, 610 or 710, object 520*b*, 620*b*, or 720*b* may include an indication that the user 510, 610, 710 requested the information resulting in the returned object.

In some implementations, the indication comprises an alert that the first user is interacting with the electronic device according to a "private" or a "semi-public" mode. An indication may also comprise an indication that a particular interaction is public, private, or semi-public. An indication may also comprise pausing or dimming of video of a participant making a private or semi-public interaction at all electronic devices excluded from the interaction. For example, the electronic device 120*b* may present the representation 510*b* of the user 510 as paused, dimmed, blacked-out, or muted, during an invocation of a private or semi-public request from the user 510 at the electronic device 120*a*. It is to be understood that electronic device may modify the representation of the user 610*a* or 710*b* in these or like manners in response to the user 610 or 710 invoking a private gaze direction command 620*v* or a private hand gesture command 720*v*. In some implementations, users excluded from a semi-public or private interaction may receive an indication that one or more private interactions is occurring within a multiuser communication session. For example, a designated speaker, lecturer, professor, or teacher may be made aware that various listeners, students, or participants in the multiuser communication session are engaged in semi-public or private communications.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a computing system including non-transitory memory and one or more processors, wherein the computing system is communicatively coupled to a display device, one or more input devices, and one or more output devices:

presenting a multiuser communication session, via the display device, that includes a first user associated with the computing system and one or more other users associated with one or more other electronic devices;

while presenting the multiuser communication session, detecting a user invocation input, via the one or more input devices, that corresponds to a trigger to a digital assistant;

detecting a user search input, via the one or more input devices, that corresponds to a request for information;

in response to detecting the user search input, obtaining the information based on the request;

in accordance with a determination that at least one of the user invocation input and the user search input satisfy first input criteria associated with a first request type, wherein the first request type includes a public interaction mode:

presenting the information via the display device, wherein presenting the information includes displaying CGR content overlaid on a physical environment or a physical object therein; and transmitting the information to the one or more other electronic devices for presentation to the one or more other users; and in accordance with a determination that at least one of the user invocation input and the user search input satisfy second input criteria associated with a second request type, wherein the second request type includes a private interaction mode:

presenting the information via the display device; and forgoing transmitting the information to the one or more other electronic devices for presentation to the one or more other users.

2. The method of claim 1, wherein at least one of the user invocation input and the user search input comprises a gaze direction.

3. The method of claim 2, wherein the gaze direction is substantially toward a virtual object.

4. The method of claim 1, wherein at least one of the user invocation input and the user search input comprises a movement or a position of a body or a body part of the user.

5. The method of claim 4, wherein the second input criteria is satisfied in response to detecting a hand raised forward with palm facing a camera of the computing system.

6. The method of claim 4, wherein the second input criteria is satisfied in response to detecting at least one of a predetermined hand gesture or movement or a predetermined head direction or movement.

7. The method of claim 1, wherein at least one of the user invocation input and the user search input comprises modulation of one or more of volume, pitch, timbre, or other audio characteristics.

8. The method of claim 7, wherein the first input criteria is satisfied in response to detecting a voice input with a first volume, and the second input criteria is satisfied in response to detecting the voice input with a second volume less than the first volume.

9. The method of claim 1, further comprising:

in accordance with a determination that at least one of the user invocation input and the user search input satisfy third input criteria associated with a third request type:

presenting the information via the display device; and transmitting the information to a subset of the one or more other electronic devices for presentation to the one or more other users.

10. The method of claim 1, further comprising:

in accordance with the determination that at least one of the user invocation input and the user search input satisfy the second input criteria associated with the second request type, transmitting an indication of the second request type to the one or more other electronic devices.

11. The method of claim 10, wherein the indication comprises transmitting an instruction for at least one of pausing video of a requesting user, muting audio of the requesting user, modifying an avatar of the requesting user, and modifying an indicator associated with the requesting user.

12. The method of claim 1, wherein the information comprises a search result or a search query including at least one of video, audio and text content.

13. The method of claim 1, wherein the information comprises at least one of an augmented reality object or event, or a virtual reality object or event.

14. The method of claim 1, wherein the multiuser communication session comprises a computer-generated reality (CGR) environment.

15. The method of claim 1, wherein the physical object comprises at least a portion of a hand or palm.

16. The method of claim 1, wherein the physical environment and the physical object therein are captured by the one or more input devices and presented via the display device.

17. The method of claim 1, wherein the physical environment and the physical object therein appear naturally through a transparent display of the display device.

18. The method of claim 1, wherein the user search input comprises at least one interrogative or imperative command.

19. A computing system comprising:

one or more processors;

a non-transitory memory;

a communication interface for communicating with a display device, one or more input devices, and one or more output devices; and one or more programs stored in the non-transitory memory, which, when executed by the one or more processors, cause the computing system to:

present a multiuser communication session, via the display device, that includes a first user associated with the computing system and one or more other users associated with one or more other electronic devices;

while presenting the multiuser communication session, detect a user invocation input, via the one or more input devices, that corresponds to a trigger to a digital assistant;

detect a user search input, via the one or more input devices, that corresponds to a request for information;

in response to detecting the user search input, obtain the information based on the request;

in accordance with a determination that at least one of the user invocation input and the user search input satisfy first input criteria associated with a first request type, wherein the first request type includes a public interaction mode:

present the information via the display device, wherein presenting the information includes displaying CGR content overlaid on a physical environment or a physical object therein; and transmit the information to the one or more other electronic devices for presentation to the one or more other users; and in accordance with a determination that at least one of the user invocation input and the user search input satisfy second input criteria associated with a second request type, wherein the second request type includes a private interaction mode:

present the information via the display device; and forgo transmitting the information to the one or more other electronic devices for presentation to the one or more other users.

20. The computing system of claim 19, wherein at least one of the user invocation input and the user search input comprises a gaze direction.

21. The computing system of claim 19, wherein at least one of the user invocation input and the user search input comprises a movement or a position of a body or a body part of the user.

22. The computing system of claim 21, wherein the second input criteria is satisfied in response to detecting a hand raised forward with palm facing a camera of the computing system.

23. The computing system of claim 21, wherein the second input criteria is satisfied in response to detecting at least one of a predetermined hand gesture or movement or a predetermined head direction or movement.

24. The computing system of claim 19, wherein at least one of the user invocation input and the user search input comprises modulation of one or more of volume, pitch, timbre, or other audio characteristics.

25. The computing system of claim 24, wherein the first input criteria is satisfied in response to detecting a voice input with a first volume, and the second input criteria is satisfied in response to detecting the voice input with a second volume less than the first volume.

26. The computing system of claim 19, wherein the one or more programs, when executed by the one or more processors, further cause the computing system to:

in accordance with a determination that at least one of the user invocation input and the user search input satisfy third input criteria associated with a third request type:

present the information via the display device; and transmit the information to a subset of the one or more other electronic devices for presentation to the one or more other users.

27. The computing system of claim 19, wherein the one or more programs, when executed by the one or more processors, further cause the computing system to:

in accordance with the determination that at least one of the user invocation input and the user search input satisfy the second input criteria associated with the second request type, transmit an indication of the second request type to the one or more other electronic devices.

28. The computing system of claim 27, wherein the indication comprises transmitting an instruction for at least one of pausing video of a requesting user, muting audio of the requesting user, modifying an avatar of the requesting user, and modifying an indicator associated with the requesting user.

29. The computing system of claim 19, wherein the information comprises a search result or a search query including at least one of video, audio, and text content.

30. The computing system of claim 19, wherein the information comprises at least one of an augmented reality object or event, or a virtual reality object or event.

31. A non-transitory memory storing one or more programs, which, when executed by one or more processors of a computing system with a display device, one or more input devices, and one or more output devices, cause the computing system to:

present a multiuser communication session, via the display device, that includes a first user associated with the computing system and one or more other users associated with one or more other electronic devices;

while presenting the multiuser communication session, detect a user invocation input, via the one or more input devices, that corresponds to a trigger to a digital assistant;

detect a user search input, via the one or more input devices, that corresponds to a request for information;

in response to detecting the user search input, obtain the information based on the request;

in accordance with a determination that at least one of the user invocation input and the user search input satisfy first input criteria associated with a first request type, wherein the first request type includes a public interaction mode:

present the information via the display device, wherein presenting the information includes displaying CGR content overlaid on a physical environment or a physical object therein; and transmit the information to the one or more other electronic devices for presentation to the one or more other users; and in accordance with a determination that at least one of the user invocation input and the user search input satisfy second input criteria associated with a second request type, wherein the second request type includes a private interaction mode:

present the information via the display device; and forgo transmitting the information to the one or more other electronic devices for presentation to the one or more other users.

32. The non-transitory memory of claim 31, wherein at least one of the user invocation input and the user search input comprises a gaze direction.

33. The non-transitory memory of claim 31, wherein at least one of the user invocation input and the user search input comprises a movement or a position of a body or a body part of the user.

34. The non-transitory memory of claim 33, wherein the second input criteria is satisfied in response to detecting a hand raised forward with palm facing a camera of the computing system.

35. The non-transitory memory of claim 33, wherein the second input criteria is satisfied in response to detecting at least one of a predetermined hand gesture or movement or a predetermined head direction or movement.

36. The non-transitory memory of claim 31, wherein at least one of the user invocation input and the user search input comprises modulation of one or more of volume, pitch, timbre, or other audio characteristics.

37. The non-transitory memory of claim 36, wherein the first input criteria is satisfied in response to detecting a voice input with a first volume, and the second input criteria is satisfied in response to detecting the voice input with a second volume less than the first volume.

38. The non-transitory memory of claim 31, wherein the one or more programs, when executed by the one or more processors, further cause the computing system to:

in accordance with a determination that at least one of the user invocation input and the user search input satisfy third input criteria associated with a third request type:

present the information via the display device; and transmit the information to a subset of the one or more other electronic devices for presentation to the one or more other users.

39. The non-transitory memory of claim 31, wherein the one or more programs, when executed by the one or more processors, further cause the computing system to:

in accordance with the determination that at least one of the user invocation input and the user search input satisfy the second input criteria associated with the second request type, transmit an indication of the second request type to the one or more other electronic devices.

40. The non-transitory memory of claim 39, wherein the indication comprises transmitting an instruction for at least one of pausing video of a requesting user, muting audio of the requesting user, modifying an avatar of the requesting user, and modifying an indicator associated with the requesting user.

41. The non-transitory memory of claim 31, wherein the information comprises a search result or a search query including at least one of video, audio, and text content.

42. The non-transitory memory of claim 31, wherein the information comprises at least one of an augmented reality object or event, or a virtual reality object or event.

* * * * *